United States Patent [19]

Takanashi et al.

[11] Patent Number: 5,159,456

[45] Date of Patent: Oct. 27, 1992

[54] PHOTO-TO-PHOTO TRANSDUCER AND METHOD OF OPERATION USING A PHOTO-MOLDULATION MEMBER AFFECTED BY A CHANGE DISTRIBUTION IN A PHOTOCONDUCTIVE MEMBER AND A VOLTAGE APPLIED ACROSS ELECTRODES

[75] Inventors: Itsuo Takanashi, Kamakura; Shintaro Nakagaki, Fujisawa; Tsutou Asakura, Yokohama; Masato Furuya, Yokosuka; Tetsuji Suzuki, Yokosuka; Keiichi Maeno, Yokosuka, all of Japan

[73] Assignee: Victor Company of Japan, Ltd., Yokohama, Japan

[21] Appl. No.: 538,979

[22] Filed: Jun. 15, 1990

[30] Foreign Application Priority Data

Jun. 16, 1989 [JP] Japan .................. 1-153773
Jul. 19, 1989 [JP] Japan .................. 1-184479
Nov. 29, 1989 [JP] Japan .................. 1-310033

[51] Int. Cl.$^5$ .................. H04N 1/028; H04N 1/40; H04N 3/15; H04N 5/30; G02F 1/135
[52] U.S. Cl. .................. 358/213.13; 358/225; 358/471; 358/909; 359/72; 359/247; 359/250; 359/252; 359/253; 359/255; 365/108; 365/112
[58] Field of Search .................. 358/213.13, 225, 209, 358/471, 424, 482, 909, 41, 55; 365/108, 112; 359/72, 87, 247, 250, 252, 253, 255

[56] References Cited

U.S. PATENT DOCUMENTS 3,932,025 1/1976 Lakatos et al. .
3,957,349 5/1976 Nelson .
4,831,452 5/1987 Takanashi .................. 358/213.13

OTHER PUBLICATIONS

Journal of Applied Physics, vol. 47, No. 2, Feb. 1976, pp. 584–590.
Soviet Technical Physical Letter, vol. 14, No. 1, Jan. 19, 1988, pp. 56–58, American Institute of Physics.

Primary Examiner—Benjamin R. Fuller
Assistant Examiner—Scott A. Rogers
Attorney, Agent, or Firm—Michael N. Meller

[57] ABSTRACT

A photo-to-photo transducer is composed by laminating a photoconductive layer member and a photo-modulation layer member including liquid crystals of scattering type each other and disposing the members between two transparent electrodes. The transducer is operated as follows: a specified voltage is applied across the electrodes to operate the photo-modulation layer member in the vicinity of operation threshold level thereof; an electro-magnetic radiation beam for writing information is projected onto the photoconductive layer member through the electrode at the side thereof; and an electro-magnetic radiation beam for reading the information is projected onto the photo-modulation layer member through the electrode at the side thereof, thus the electro-magnetic radiation beam for reading the information is modulated accordingly with intensity of the electro-magnetic radiation beam for writing the information.

13 Claims, 18 Drawing Sheets

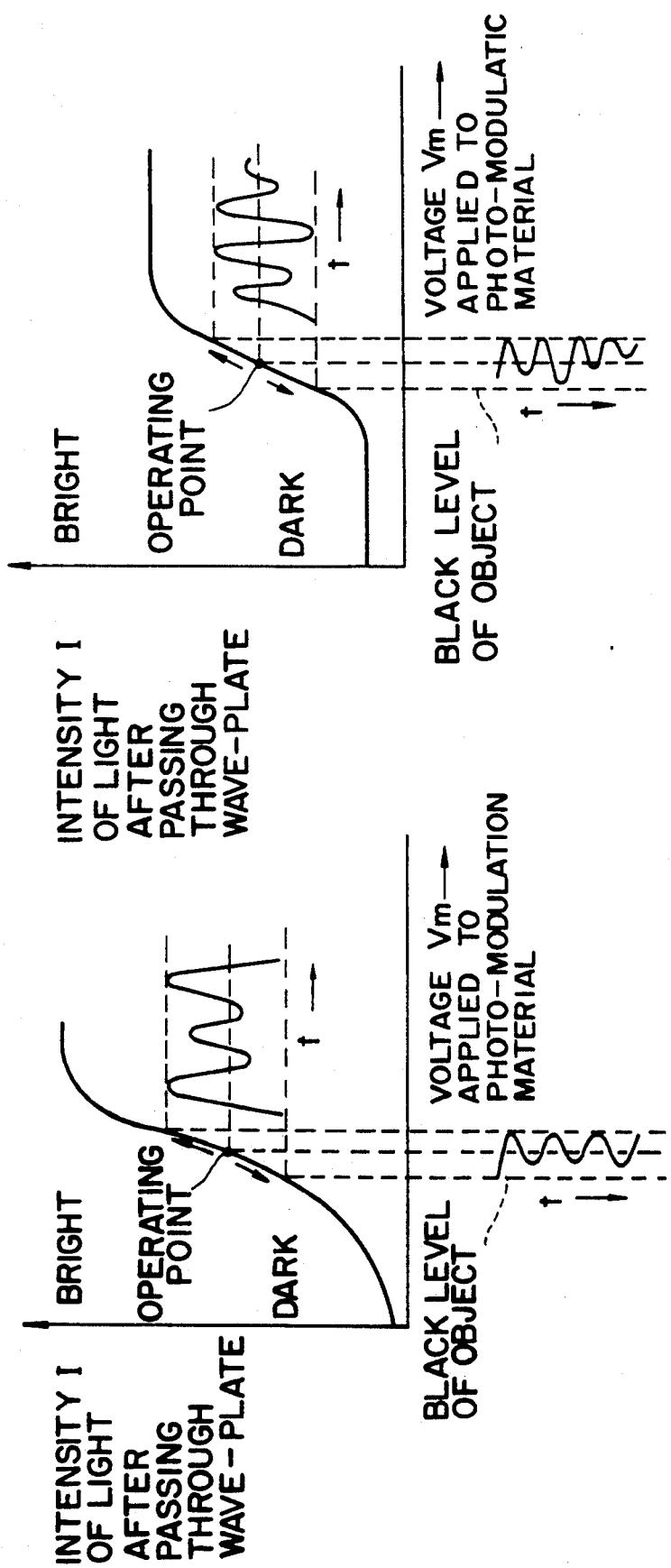

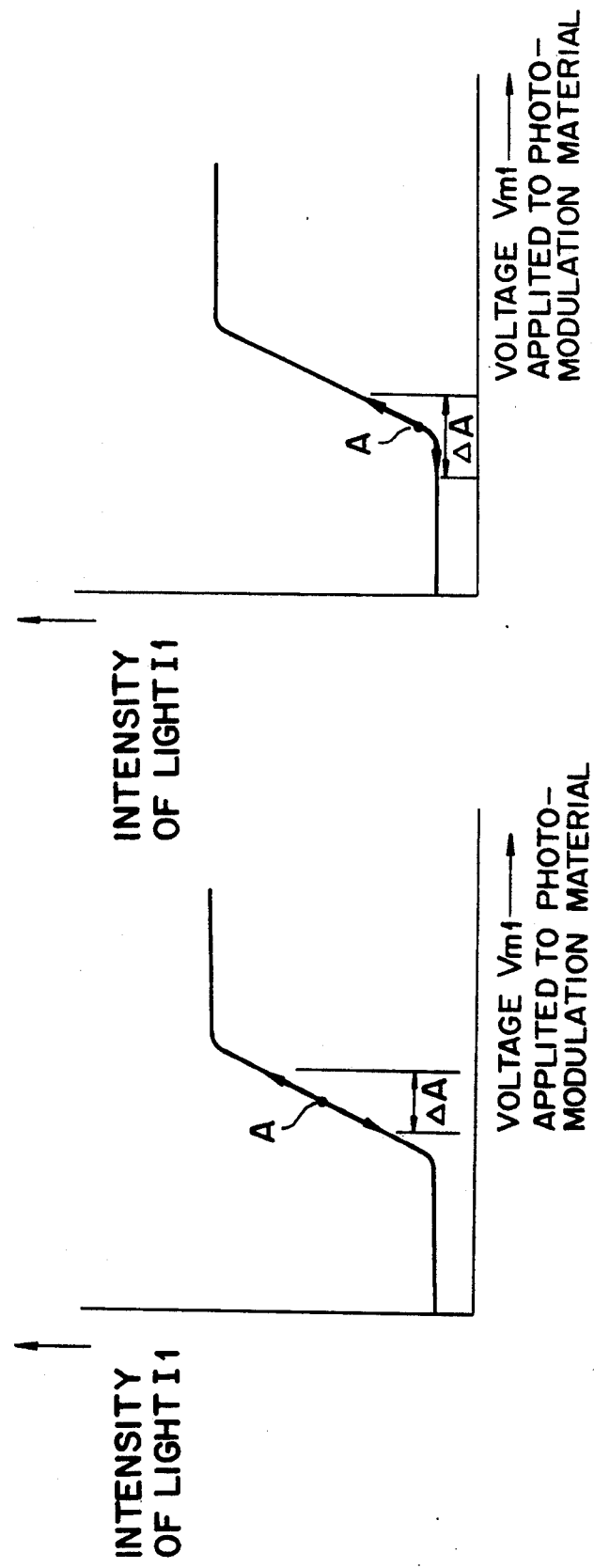

PHOTO-TO-PHOTO TRANSDUCER AND METHOD OF OPERATION USING A PHOTO-MOLDULATION MEMBER AFFECTED BY A CHANGE DISTRIBUTION IN A PHOTOCONDUCTIVE MEMBER AND A VOLTAGE APPLIED ACROSS ELECTRODES

BACKGROUND OF THE INVENTION

This invention relates to a method for operating a photo-to-photo transducer (abbreviated as PPC hereinafter) which transduces information carried by an electro-magnetic radiation beam such as light into the same form applicable to an image pickup apparatus, an optical projector or an optical computer.

A video signal obtained by picking up an optical image of an object can be easily processed by editing, trimming and the like. Recording, reproducing and erasing the video signal also can be easily performed. These techniques have been widely used in various fields such as printing, electronic publishing, measuring and the like.

There has been an increased demand for an apparatus capable of imaging and recording an optical information such as a moving picture or an image with a higher resolution when compared to a conventional apparatus.

In order to reproduce images with high quality and resolution, it is necessary for an image pickup apparatus to generate a video signal by which an image of high quality and resolution can be reproduced. However, an image pickup apparatus using an image pickup tube has a limit for minimizing the diameter of an electron beam, and also the target capacity thereof increases as its size becomes large, resulting in a poor resolution.

Furthermore, for high resolution moving images, the frequency band of a video signal becomes larger than several tens to hundreds MHz, thus posing a problem of poor S/N. The above problems have made it difficult to obtain video signals which can reproduce images of high quality and resolution.

As for a PPC capable of receiving an optical image of an object and emitting the optical image applicable to optical parallel processing in an optical projector and an optical computer and image-recording, for example, a space-modulation device such as a liquid crystal-type optical modulator, a photoconductive-Pockels effect device and a microchannel-type optical modulator or a device made of a photochromic material have been remarked on.

The assignee of this application has proposed an image pickup apparatus with high resolution employing the PPC which is shown in FIG. 1.

Throughout the drawings, like reference numerals and letters are used to designate like or equivalent elements for the sake of simplicity of explanation.

The image pickup apparatus shown in FIG. 1 comprises an imaging lens 10, a PPC 12, a beam splitter 24, a wave-plate 26, an analyzer 28, a polarizer 30 and a light source 32 such as a semiconductor laser.

The PPC 12 is composed of transparent electrodes 14 and 22, a photoconductive layer (abbreviated as PCL) member 16, a dielectric mirror 18 and a photo-modulation layer (abbreviated as PML) member 20 which is an optical member (such as a monocrystal of lithium niobate or a field effect nematic liquid crystal layer) for polarizing a plane of light according to with the intensity of an applied electric field. A power supply 34 causes an electric field across the transparent electrodes 14 and 22 by turning on a switch 36. The PPC 12 is installed into a black box not shown so that the PCL member 16 is not unnecessarily exposed to ambient light.

The transparent electrode 14 is composed of a material such as ITO (Indium-Tin Oxide) having a spectral characteristic such that light having a wave-length carrying optical information to be photographed passes therethrough.

As for the PCL 16, a photoconductive material (such as amorphous silicon) having a characteristic such that a field intensity distribution with high resolution is generated on a surface thereof when an optical image with high resolution is incident to the other surface thereof under an electric field with proper intensity.

In FIG. 1, light carrying an optical image of an object O is incident to the transparent electrode 14 through an imaging lens 10. The light passes through the transparent electrode 14 and is incident to the PCL member 16. The electric resistance of the PCL member 16 varies accordingly with the intensity of the light. The electric resistance of each portion of the PCL member 16 thus varies accordingly with the intensity of each portion of the object O.

The power supply 34 applies a specific voltage across the transparent electrodes 14 and 22 through the switch 36. Therefore, the electric field (a voltage Vm) with a field intensity corresponding to the optical image is applied across the PML member 20 which is provided so as to face the PCL member 16 through the dielectric mirror 18.

If the PML member 20 is composed of monocrystal of lithium niobate, the refractive index thereof varies with the electric field due to the electro-optic effect. Therefore, in the PML member 20, the refractive index varies with the field intensity distribution based on the impedance of the PCL member 16 varying accordingly with the optical image incident thereto.

A light P1 such as a laser beam emitted from the light source 32 passes through the polarizer 30 and is reflected at the beam splitter 24, then is incident to the PML member 20 through the transparent electrode 22.

The electric field whose field intensity-distribution is varying accordingly with the optical image is generated across the PML member 20, so that the light P1 thus incident thereto is modulated accordingly with the optical image. The light P1 thus modulated is reflected at the dielectric mirror 18 and passes through the beam splitter 24, the wave-plate 26 and the analyzer 28, then is picked up as a reproduced image.

FIG. 2 shows the relationship between the primary electro-optic effect and the voltage Vm applied to the PML member 20 (composed of a material such as monocrystal of lithium niobate $LiNbO_3$, Bismuth Silicon Oxide, Potassium dihydrogen phosphate and DKDP). The axis of ordinates denotes the intensity I of the light P1 after passing through the wave-plate 26 and the analyzer 28, and the abscissa denotes the voltage Vm applied to the PML member 20. FIG. 3 shows the same relationship as that shown in FIG. 2. In this case, the PML member 20 is made of field effect nematic liquid crystal.

Each of the waveforms shown in FIGS. 2 and 3 with time base in an ordinates direction is the voltage applied to the PML member 20 accordingly with the optical image of the object O. While each of those in an abscissa direction is the light emitted from the analyzer 28, whose intensity is varying with the voltage in the ordinates direction.

As is understood from FIGS. 2 and 3, setting the operating point of the PML member 20 is done by adjustment of the wave-plate 26 or reorientation of the analyzer 28, so that the black level of the optical information of the optical image of the object O is reproduced as it is.

However, in the case of employing scattering-type liquid crystal or PLZT (Lead Lanthanum Zirconate Titanate) of the scattering mode as the PML member 20, the operating point thereof cannot be set by adjustment of the wave-plate 26 or reorientation of the analyzer 28.

Furthermore, the image pickup apparatus proposed by the assignee of this application requires the analyzer 28 so that the utility efficiency of light is inevitably lowered or shading occurs.

Moreover, when a twisted-nematic liquid crystal or other electro-optic liquid crystal having a double refraction characteristic is employed as the PML member 20, the utility efficiency of light is substantially lowered when a light P1 is incident to the PML member from the direction other than a normal line on the surface of the PML member 20 since photo-modulation therein depends on the direction of an optical axis of the liquid crystal.

Therefore, the incidence direction of the light P1 to the PML member 20 is set in the normal direction. Optical members such as a semi-transparent mirror and a deflection-beam splitter are thus provided along with an optical passage so as to separate the light P1 incident to the PPC 12 is reflection type.

When a twisted-nematic liquid crystal layer is employed as the PML member 20, a complex process is required, that is, a twisted-nematic liquid crystal is injected into a cell made with spacers. Furthermore, when a large PPC is produced, it is difficult to compose a PML by means of a twisted-nematic liquid crystal layer with uniform thickness. Moreover, when a monocrystal of lithium niobate or other solid state component is employed as the PML member 20, a high electric field (or a voltage) is required for obtaining a desired electro-optic effect and the PPC 12 must be handled very carefully.

When the PPC 12 is composed flat, a complex deflection-optical system such as a doublet spatial lens is required for writing image information on the entire surface of the PPC 12.

SUMMARY OF THE INVENTION

A purpose of the present invention is to provide a method for operating a photo-to-photo transducer to set the black level of information (an image) to be read at a high contrast ratio.

In carrying out the present invention in one preferred mode, we utilize the method comprising the steps of:

composing the photo-to-photo transducer by laminating a photoconductive layer member and a photo-modulation layer member each other and disposing the members between two transparent electrodes;

applying a specified voltage across the electrodes to operate the photo-modulation layer member in the vicinity of an operation threshold level thereof;

projecting an electro-magnetic radiation beam for writing information onto the photoconductive layer member through the electrode at the side thereof; and projecting an electro-magnetic radiation beam for reading the information onto the photo-modulation layer member through the electrode at the side thereof, whereby the electro-magnetic radiation beam for reading the information is modulated accordingly with the intensity of the electro-magnetic radiation beam for writing the information.

Other objects and advantages of the present invention will become apparent from the detailed description to follow taken in conjunction with the appended claims.

BRIEF DESCRIPTION OF THE DRAWINGS

FIGS. 2 and 3 are the characteristics for explaining the conventional image pickup apparatus employing a photo-to-photo transducer;

FIGS. 5 to 7 are the characteristics for explaining the method according to the present invention;

DESCRIPTION OF THE PREFERRED EMBODIMENTS

The present invention will now be described in detail with reference to the accompanying drawings.

Figure 1:
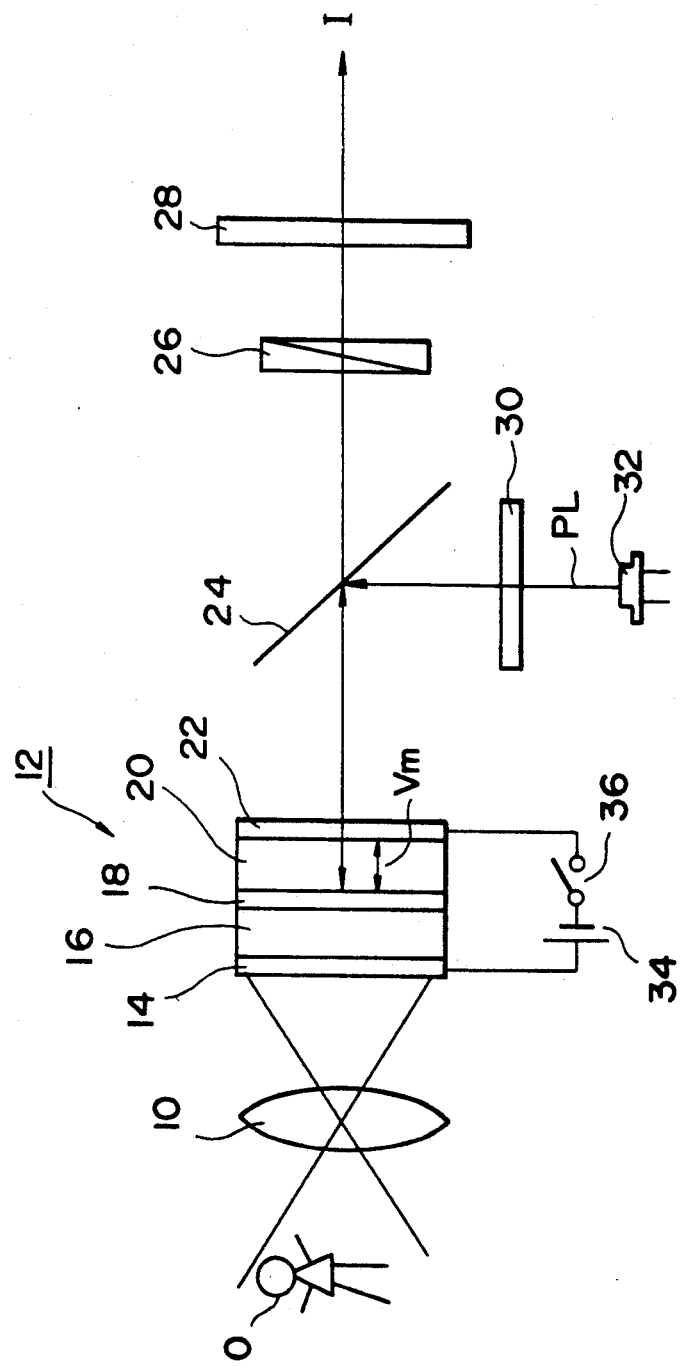
FIG. 1 is a side sectional view of a conventional image pickup apparatus employing a photo-to-photo transducer.
Figure 4:
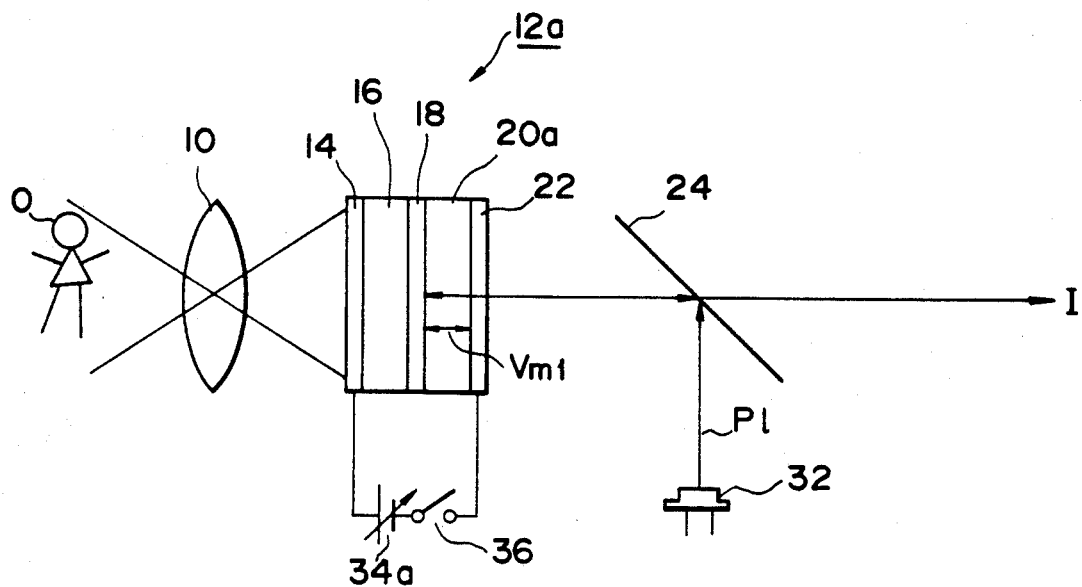
FIG. 4 is a side sectional view of an image pickup apparatus employing a photo-to-photo transducer operated by the method according to the present invention.

A photo-to-photo transducer 12a shown in FIG. 4 is provided with a PML member 20a composed of a liquid crystal layer of the scattering type, such as scattering-mode liquid crystals and PLZT instead of the PML member 20 shown in FIG. 1. There is further provided a variable power supply 34a. Compared to the conventional photo-to-photo transducer 12 shown in FIG. 1, a light P1 which is reflected at a dielectric mirror 18 and again passes through the PML member 20a can be read out, as it is, as a reproduced image.

Figure 5:
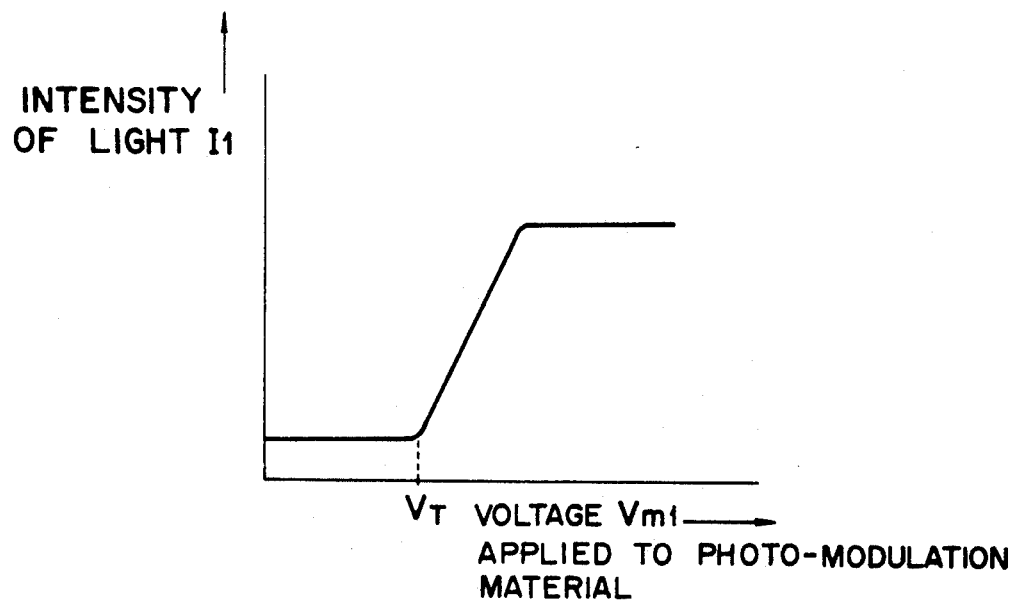

FIG. 5 shows the characteristic of the PML member 20a, that is, a voltage Vm1 applied thereacross and an intensity of light $I_1$ passing therethrough (being read out). There exists a threshold voltage $V_T$, so that the PML member 20a is operated when the voltage Vm1 exceeds the threshold voltage $V_T$.

When an operating point of the PML member 20a is on the point A, as depicted in FIG. 6, by adjusting the thickness of the layers of the PPC 12a, their impedance and the voltage applied across the transparent electrodes 14 and 22, the black of signal component A (black level of an optical image of an object) cannot be reproduced as black (the black level of optical information).

Accordingly, when this light, as it is, is photoelectrically converted into a video signal which is displayed on a monitor, only an image with small contrast ratio is obtained. Furthermore, an optical information as black of the optical image of the object and the black level of the video signal obtained by photoelectric conversion cannot be completely matched to each other.

Therefore, according to the present invention, as is depicted in FIG. 7, black of the signal component is adjusted below the threshold voltage $V_T$, which black can be reproduced in the reproduced information reproduced image) as the black (the black level of the optical information) by varying the thickness of the layers of the PPC 12a, the voltage applied across the transparent electrodes 14 and 22 or composition of the PML member 20a to vary the operating point thereof. If the PML member 20a is composed of the composite membrane of macromolecule and liquid crystal, their mixing ratio is varied to change the characteristics of the PML member 20a.

The operating point can be determined by adjusting the voltage applied from the power supply 34a when a light carrying an optical image is incident on the PCL member 16 or combining a.c. and d.c. bias voltages. Furthermore, the operating point is also determined by providing a mesh electrode between the PCL and PML members 16 and 20a and applying a bias voltage across the mesh electrode and the transparent electrode 22.

As is described above, the black level of the read image information (reproduced image) can be read and reproduced with high contrast ratio by operating the PML member below the threshold voltage (or at its voltage or just above) in the photo-to-photo transducer employing the PML member of the scattering mode.

Figure 8:
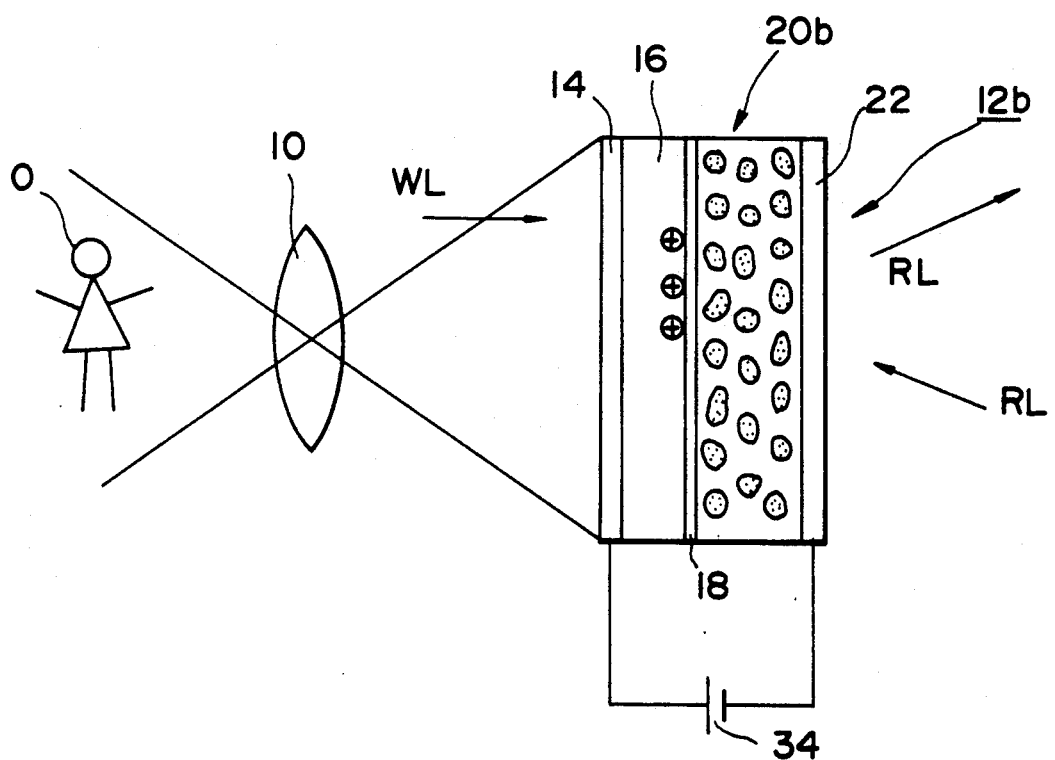
FIGS. 8 to 11 and 14 to 17 are side sectional views of image pickup apparatus according to the present invention.

In FIG. 8, a PPC 12b is composed of a transparent electrode 14, a PCL member 16, a dielectric mirror 18, a PML member 20b composed of the composite membrane of macromolecule and liquid crystal in which high resistance liquid crystals are dispersed in macromolecular material and a transparent electrode 22, laminated to each other in order. Each PPC 20b shown in FIGS. 9 to 12 is also composed in the same configuration as described above.

There is provided the dielectric mirror 18 between the PCL member 16 and the PML member 20b in FIGS. 8 to 12. However, this dielectric mirror 18 can be omitted if the PCL member 16 is composed so as not to sense a light RL for reading and the light RL is reflected there. The dielectric mirror 18 shown in FIGS. 14 to 17 also can be omitted.

The composite membrane employed as the PML member 20b shown in FIG. 8 will be explained. The composite membrane is composed by scattering nematic liquid crystals which have a characteristic of being liquid crystal at a room temperature and have high volume resistivity in a macromolecular material such as polyester resin, polycarbonate resin, vinyl chloride resin, polyamide resin, polyethylene resin, polypropylene resin, polystyrene resin and silicon resin, each having volume resistivity of $10^{14}$ $\Omega$-cm or more.

Followings are the examples of production of the PPC 12b including the PML member 20b shown in FIGS. 8 to 11 and 13.

(1) Three grams of nematic liquid crystal E-44, manufactured by BDH Co., in the UK is added to 10% chloroform solution in 20 grams of PMMA (Polymethylmethacrylate). The solution then is stirred and left alone.

A glass plate, a surface thereof being coated with ITO (Indium-Tin Oxide) membrane (not shown in FIGS. 8 and 9) as the transparent electrode 22, is sufficiently washed. The chloroform solution in PMMA containing liquid crystals is applied onto the transparent electrode 22 by means of a bar coater to compose the PML member 20b of the composite membrane.

As for the macromolecular material, other than PMMA, any macromolecular materials which can be dissolved into solution and applied onto anything as a membrane and also has high volume resistivity can be used. For example, polycarbonate and PEI (Polyether Imide) having better transparency are particularly advantageous. This is also the same for the examples (2) and (3) described later.

Figure 9:
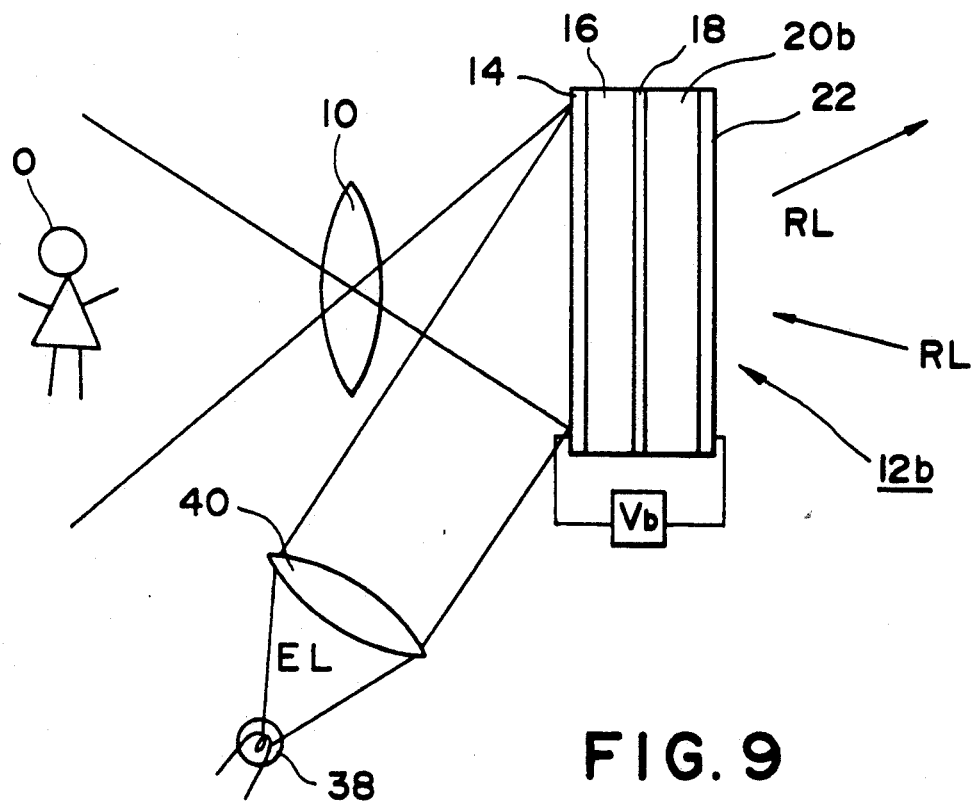

A compound composed by laminating the glass plate produced as above, the transparent electrode 22 and the PML member 20b with each other and a compound produced with a process different from above, that is the compound composed by laminating a glass plate (not shown in FIGS. 4 and 5), the transparent electrode 14 and PCL member 16 and the dielectric mirror 18 with each other, are stuck to each other to form the PPC 12b shown in FIGS. 8 and 9.

(2) Three grams of nematic liquid crystals LIXON 501 DML (or LIXON 5028) manufactured by Chisso Co. are added to 10 wt. % chloroform solution 20 gm of PMMA The solution then is stirred and left alone. Other procedures are the same as described in example (1).

(3) Three grams of nematic liquid crystals ZLIEt22DMLDML exhibiting cybotaxis manufactured by Merck Japan Ltd. are added to 10 wt. % chloroform solution in 20 gm of PMMA. The solution then is stirred and left alone. Other procedures are the same as described in example (1).

It is easy to form the composite membrane of macromolecular and liquid crystals so as to have a thickness of the membrane of about 0.1 micron compared to the conventional PPC.

The liquid crystals contained in the PML member 20b produced as above are in the state that the crystals are confined to innumerable pores in the macromolecular materials. The pores are larger than those confining liquid crystals in the composite membrane of macromolecular and liquid crystals employed as a PML member 20c in PPCs 12c and 12d shown in FIGS. 14 to 17, respectively.

The nematic liquid crystal used in examples (2) and (3) has such a high resistivity of $1 \times 10^{13}$ $\Omega$-cm. Therefore, image information with high resolution can be read/written by means of the PPC 12b including the PML member 20b composed of the macromolecular material with a volume resistivity of $1 \times 10^{13}$ $\Omega$-cm or more into which the liquid crystals are dispersed.

Furthermore, even if the electric field applied to the composite membrane employed as the PML member 20b is a direct electric field, the resolution of the image information is not degraded as time elapses owing to the high resistance of the liquid crystals (with low contamination of ions).

When the liquid crystal with low volume resistivity including many ions is used for the PML member 20b, the ions transfer due to the electric field applied thereto to lower the intensity of the electric field generated by the charge image. Inclination of the optical axis of molecules of the liquid crystal is thus decreased to degrade the resolution of the charge image due to scattering of the electric field generated by the charge image.

However, the nematic liquid crystal used in examples (2) and (3) contains few ions so that the undesirable phenomenon described above does not occur. Therefore, the reading/writing operation of the image information with high resolution can be performed.

In the image pickup apparatus shown in FIG. 8, when a voltage is applied across the transparent electrodes 14 and 22 by the power supply 34 and the optical image of the object O is projected onto the PCL member 16 of the PPC 12b the imaging lens 10, the electric resistance of the PCL member 16 varies accordingly with the optical image. The charge image corresponding to the optical image is thus generated in the vicinity of the border of the PCL member 16 and the dielectric mirror 18.

This causes an electric field whose intensity distribution corresponds to the charge distribution of the optical image to be applied to the PML member 20b. In the PML member 20b, the liquid crystal is reoriented due to the electric field. This results in an image generated in the PML member 20b, in which the reorientation of the liquid crystal corresponds to the optical image.

The image thus generated in the PML member 20b is maintained as it is as far as there is the charge image in the vicinity of the border of the PCL member 16 and the dielectric mirror 18.

As is already described, since high resistance liquid crystal is included in the PML member 20b, the resolution of the image is not degraded as time elapses, though the electric field applied to the PML member 20b is the direct electric field.

An a.c. power supply may be used instead of the power supply 34 in FIG. 8. However, the writing operation described as above is not performed, so that writing and reading operations must be performed at the same time.

When the charge image thus generated in the vicinity of the border of the PCL member 16 and the dielectric mirror 18 is erased (the charge image is generated in the vicinity of the border of the PCL member 16 and the PML member 20b if the dielectric mirror 18 is omitted), the electric field applied to the PML member 20b is also erased so that the liquid crystal contained in the PML member 20b exhibits isotropy. Therefore, image information cannot be read out even if a light RL is incident to the PML member 20b, that is, an erasing operation is performed.

Accordingly, as to the erasing operation, it is enough to erase the charge image generated in the vicinity of the border of the PCL member 16 and the dielectric mirror 18. In order to erase the charge image, as is shown in FIG. 9, a light EL emitted from a light source 38 for the erasing operation is incident to the PPC 12b at the transparent electrode 14 side thereof through a lens 40 to lower the electric resistance of the PCL member 16. In the case of the erasing operation, two transparent electrodes 14 and 22 may be short-circuited to each other or grounded together.

As is described above with reference to FIG. 8, by way of the writing operation, the charge image corresponding to the optical image of the object O is generated in the vicinity of the border of the PCL member 16 and the dielectric mirror 18 (or the border of the PCL member 16 and the PML member 20b if the dielectric mirror 18 is omitted), then the electric field generated by the charge image is applied to the PML member 20b.

When a light RL emitted from a light source not shown is incident to the PPC 12b at the transparent electrode 22 side thereof, the light RL reaches the dielectric mirror 18 through the transparent electrode 22 and the PML member 20b. After being reflected at the dielectric mirror, the light RL is emitted from the PPC 12b at the transparent electrode 22 side thereof through the PML member 20b.

The intensity of the light RL thus emitted from the PPC 12b varies accordingly with the electric field generated by the charge image.

That is, the liquid crystals are reoriented accordingly with the electric field applied thereto when the electric field whose intensity is varying accordingly with the charge distribution corresponding to the optical image of the object O is applied to the liquid crystals contained in the composite membrane employed as a PML member 20b.

The light RL reciprocally transferring in the PML member 20b is thus scattered in different directions with respect to the light RL incident to the PML member 20b and emitted therefrom. Therefore, by projecting the light RL onto the PML member 20b, the intensity of the light RL emitted therefrom varies accordingly with the optical image of the object O.

The light RL thus emitted from the PPC 12b can be projected as it is onto a screen through a projection lens, supplied to a photoelectric converter through an optical system to be converted into electric signals, or supplied to an optical recording medium through an optical system to be recorded thereon.

The light source for generating the light RL may be a laser source, an incandescent lamp, an electric discharge lamp and the like. The light RL may be a bundle of beams with any diameter.

As is understood from the foregoing, the image pickup apparatus according to the present invention can be made in a simple configuration and effectively treated compared to conventional apparatus in which a light emitted from a PPC is converted into the light whose intensity is varying accordingly with an optical image of an object by means of an analyzer.

Figure 10:
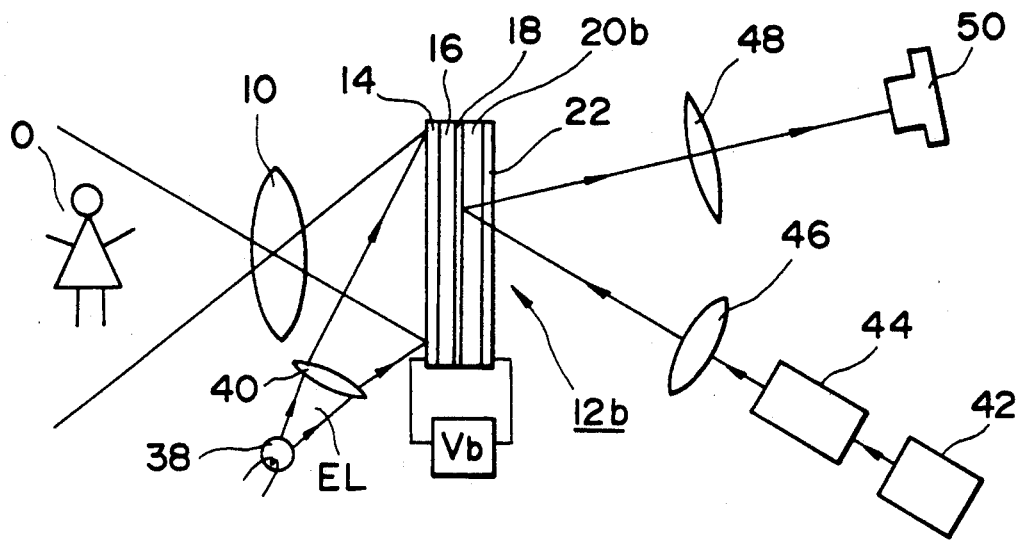

FIG. 10 shows an embodiment in which the light RL emitted from the PPC 12b shown in FIG. 9 is converted into electric signals corresponding to the optical image of the object O. The writing, reading and erasing operations in FIG. 10 are the same as described with reference to FIG. 9.

In FIG. 10, a laser beam is emitted from a laser source 42 and deflected by a deflector 44. The laser beam thus reflected is incident to the PPC 12b at the transparent electrode 22 side thereof through a lens 46. The laser beam thus incident to the PPC 12b is then emitted out therefrom at the transparent electrode 22 side thereof in the same manner as described above.

The light RL thus emitted from the PPC 12b is then supplied to a photoelectric converter 50 through a lens 48. The electric signals corresponding to the optical image of the object O is thus generated from the photoelectric converter 50. Deflection in the deflector 44 depends on the photoelectric converter 50. A phototransistor, a line-image sensor, a two dimensional-image sensor, etc. may be employed as the photoelectric converter 50.

Figure 11:
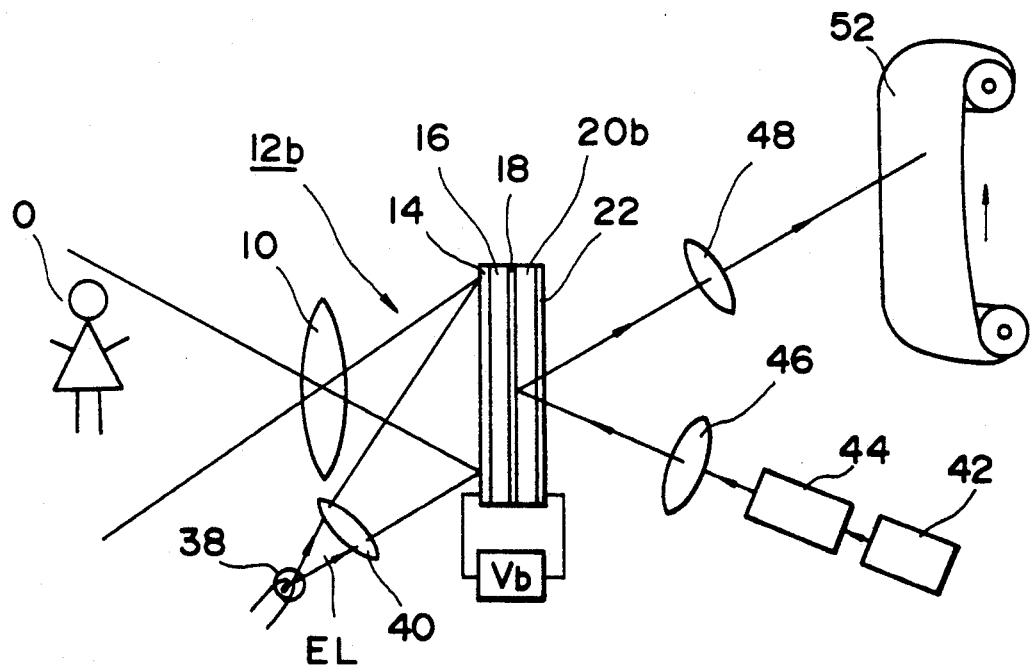

FIG. 11 shows an embodiment in which an optical recording medium 52 such as a photographic film is adopted instead of the photoelectric converter 50 in FIG. 10. A charge image recording medium also can be employed as the optical recording medium 52. In the case of the charge image recording medium without a photoconductive member, a charge image can be recorded on the recording medium by means of a writing device having a photoconductive member.

Figure 12:
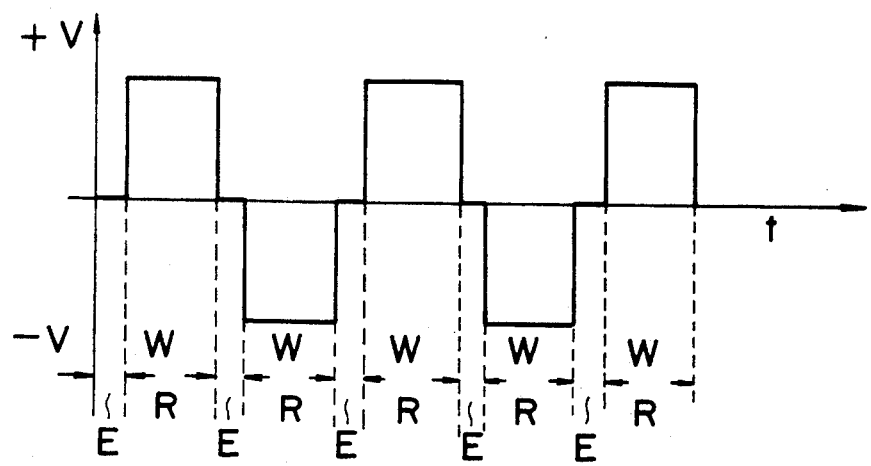
FIG. 12 shows a timing chart for the explanation of photographing a moving picture.

FIG. 12 is a chart for explaining the operation of the image pickup apparatus in which a polarity of the voltage applied across the transparent electrodes 14 and 22 of the PPC 12b is inverted as +V and −V per image. In FIG. 12, E denotes the period of time for irradiating the erasing light, while W and R denote the writing and reading period of time, respectively.

Figure 13:
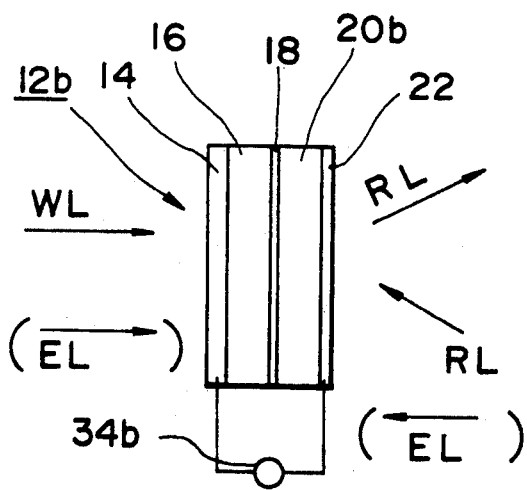
FIG. 13 is a side sectional view of a photo-to-photo transducer for explaining the image pickup apparatus according to the present invention.

FIG. 13 shows the configuration in which a voltage being inverted as +V and −V is applied across the transparent electrodes 14 and 22 by a power supply 34b. When a continuous d.c. electric field is applied to the composite membrane employed as the PML member 20b, the photo-modulation capability thereof is degraded due to ions contained in the liquid crystals. Therefore, such degradation is restricted by means of the power supply 34b.

Next, embodiments of the image pickup apparatus according to the present invention will be explained with reference to FIGS. 14 to 17.

Figure 14:
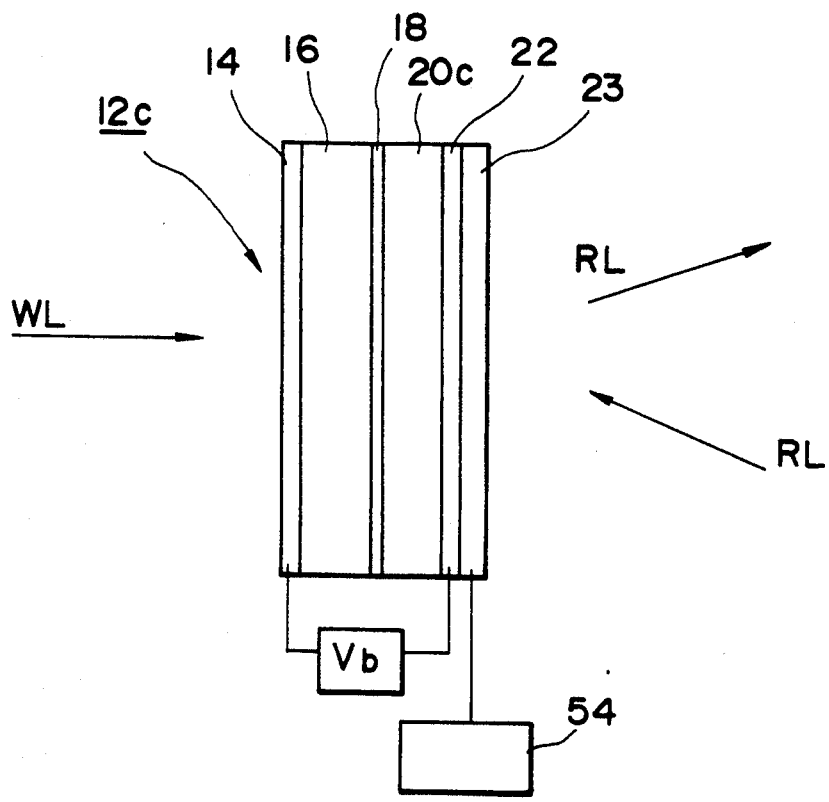

A PPC 12c shown in FIG. 14 is composed by laminating in order the transparent electrode 14, the PCL member 16, the dielectric mirror 18, a PML member 20c composed of a memory membrane of macromolecular and liquid crystals which are scattered into macromolecular material, the transparent electrode 22 and a heat generation layer 23. The layer acting as the transparent electrode 22 and also the heating layer 23 may be adopted.

Figure 15:
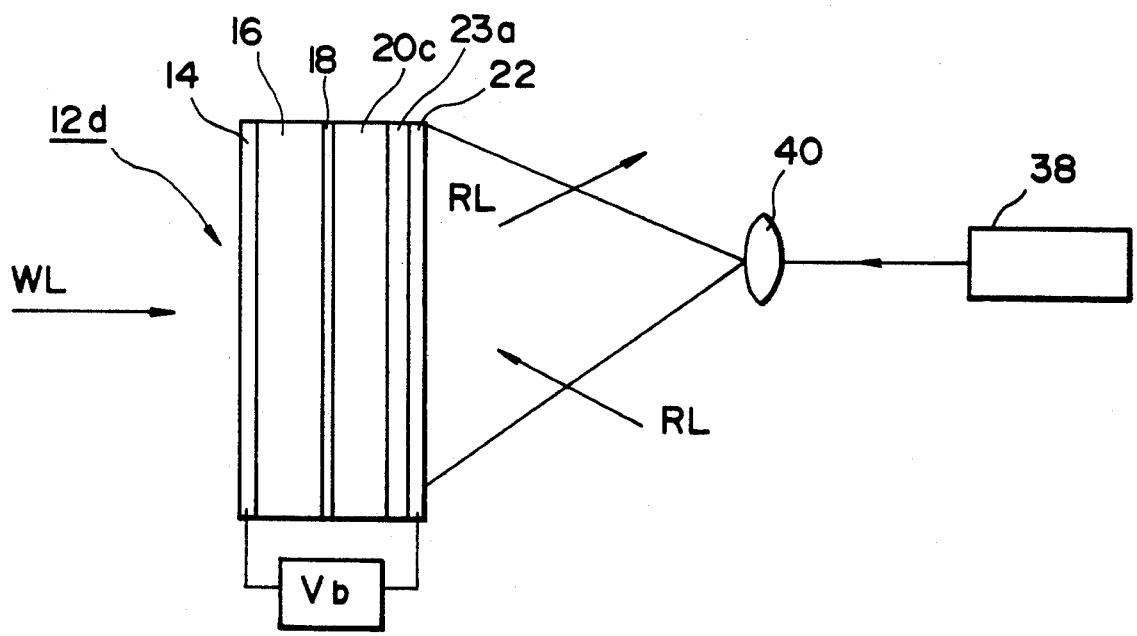
Figure 16:
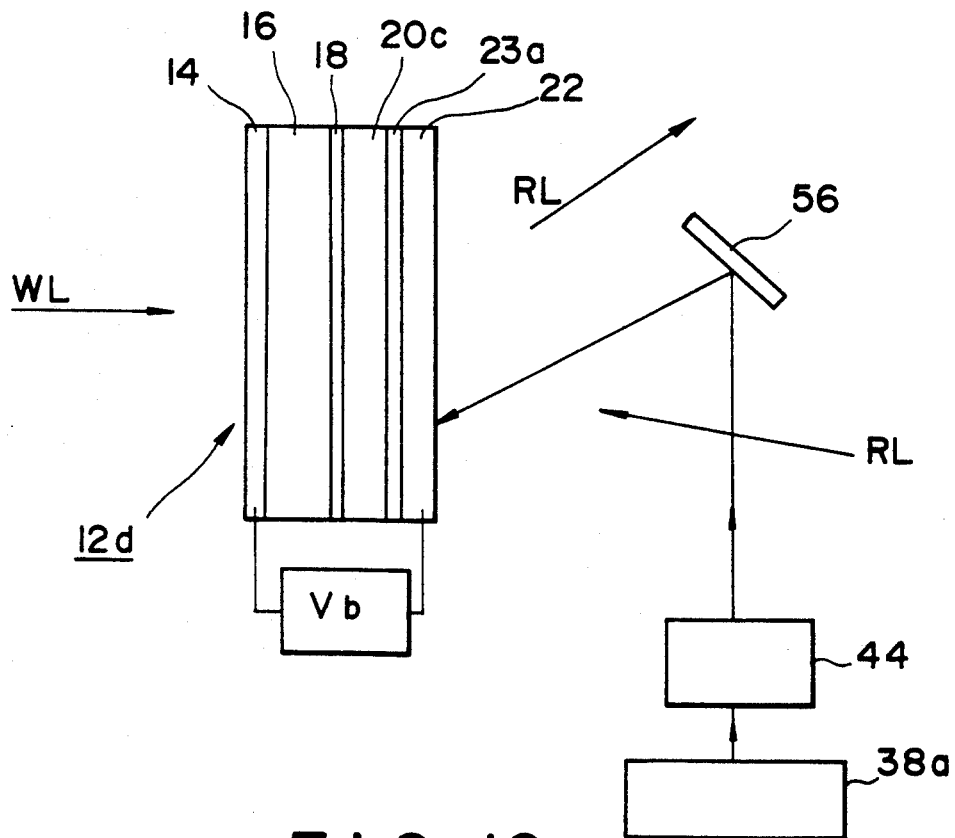

Each of PPC 12d shown in FIGS. 15 and 16 is composed by laminating in order the transparent electrode 14, the PCL member 16, the dielectric mirror 18, the PML member 20c, a heat generation layer 23a and the transparent electrode 22.

Figure 17:
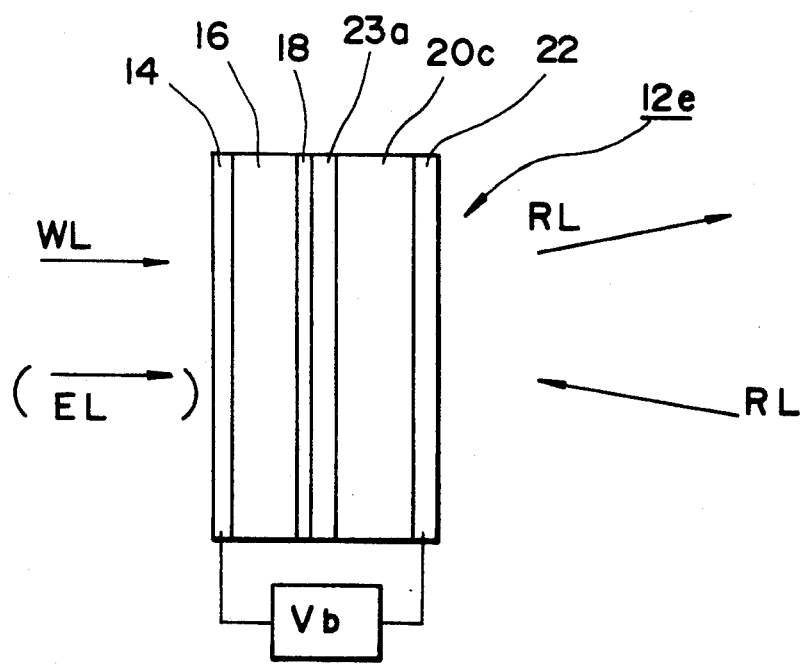

A PPC 12e shown in FIG. 17 is composed by laminating in order the transparent electrode 14, the PCL member 16, the dielectric mirror 18, the heat generation layer 23a, the PML member 20c and the transparent electrode 22.

There is provided a dielectric mirror 18 between the PCL member 16 and the PML member 20c respectively in FIGS. 14 to 16. However, this dielectric mirror 18 can be omitted if the PCL member 16 is composed so as not to sense a light RL and the light RL is reflected there. The dielectric mirror 18 provided between the PCL member 16 and the PML member 20c in FIG. 17 also can be omitted if either the PCL member 18 or the heat generation layer 23 is composed so as not to sense a light RL and the light RL is reflected there.

The heat generation layer 23 provided in the PPC 12c shown in FIG. 14 is heated by power applied by a heating power supply in the case of the erasing operation to melt the liquid crystals included in the PML member 20c. The heat generation layer 23a provided in the PPC 12c shown in FIGS. 15 to 17 is heated by an erasing light in the case of the erasing operation to melt the liquid crystals included in the PML member 20c.

The memory membrane employed as the PML member 20c is composed like the PML member 20b shown in FIG. 8 such that nematic liquid crystals which have the characteristic of being liquid crystal at room temperature and have high volume resistivity are dispersed in a macromolecular material such as methacrylic resin, polyester resin, polycarbonate resin, polypropylene resin, polystyrene resin and silicon resin, each having volume resistivity of $10^{14}$ Ω-cm or more.

Any type of liquid crystal can be adopted for composing the PML member 20c if the molecules in the liquid crystal are not arranged in layers but all of their axes are parallel at room temperature. Employment of liquid crystals having higher volume resistivity and viscosity results in reproduction of information with higher contrast ratio or higher recording performance. The liquid crystals should have a lower melting point than that of the macromolecular material.

The memory membrane employed as the PML member 20c has a memory function such that once the liquid crystals in the memory membrane are reoriented by applying an electric field thereto, that state is not changed even if the electric field is removed. This is different from the PML member 20c shown in FIG. 8 in which the liquid crystals are reoriented by the electric field applied thereto.

The memory membrane described as above is composed such that liquid crystals are enclosed in innumerable pores randomly distributed in the macromolecular material. The liquid crystals thus cannot freely change their orientation direction. When an electric field is applied thereto to give enough energy to the liquid crystals larger than that of the macromolecular material, the liquid crystals are reoriented. The state of the liquid crystals thus reoriented is subjected to the macromolecular material to maintain the state. Therefore, the orientation direction memorizes the state that the liquid crystals are applied with the electric field. Namely, the memory membrane exhibits a memory function. The larger the pores in which the liquid crystals are enclosed, the more difference in orientation among the liquid crystals. This results in degradation in memory function. Accordingly, it is desirable to have pores with a diameter of 0.5 μm or less and uniformly dispersed.

In order to erase the information memorized due to the reorientation, the liquid crystals in the memory membrane are heated to a temperature between the melting point of the liquid crystals and that of the macromolecular material to be melted to exhibit isotropy. The liquid crystals thus melted are cooled down as time elapse to become nematic. The liquid crystal thus made nematic become opaque.

In the image pickup apparatus shown in FIG. 14, a voltage is applied across the two transparent electrodes 14 and 22 to apply an electric field to the PML member 20c and an optical image of an object is projected onto the PCL member 16 carried by a light WL through an imaging lens not shown. The electric resistance of the PCL member 16 varies accordingly with the optical image emitted therein. The charge image corresponding to the optical image is thus generated in the vicinity of the border of the PCL member 16 and the dielectric mirror 18.

Then, an electric field with an intensity distribution corresponding to the charge distribution of the charge image is applied to the PCL member 20c.

The liquid crystals in the PML member 20c are reoriented due to the electric field caused by the charge image corresponding to an electro-magnetic radiation beam. The reoriented state is thus memorized. The memorized reoriented state is maintained even if the charge image generated in the vicinity of the border of the PCL member 16 and the dielectric mirror 18 is erased.

When a light RL is incident to the PPC 12c at the heat generation layer 23 side thereof from a light source not shown in FIG. 14, the light RL reaches the dielectric mirror 18 through the heat generation layer 23, the transparent electrode 22, and the PML member 20c. After being reflected there, the light RL is emitted from the PPC 12c through the PML member 20c, the transparent electrode 22 and the heat generation layer 23.

The light RL thus emitted from the PPC 12c varies accordingly with the reoriented liquid crystals in the PML member 20c. Therefore, the light RL emitted from the PPC 12c can be projected as it is onto a screen through a projection lens, supplied to a photoelectric converter through an optical system to be converted into electric signals, or supplied to an optical recording medium through an optical system to be recorded thereon.

As is understood from the foregoing, the image pickup apparatus according to the present invention can be made in a simple configuration and effectively treated compared to conventional apparatus in which a light emitted from a PPC is converted into the light whose intensity is varying accordingly with an optical image of an object by means of an analyzer.

The light source for generating the light RL may be a laser source, an incandescent lamp, an electric discharge lamp and the like. The light RL may be a bundle of beams with any diameter.

In order to erase information memorized by orientation of the liquid crystals in the PML member 20c, the liquid crystals are heated to the temperature between the melting point of the liquid crystals and that of the macromolecular material to be melted to have the characteristics of the liquid crystal.

In the image pickup apparatus shown in FIG. 14, a heating power is applied from a heating power supply 54 to the heat generation layer 23 of the PPC 12c (a layer acting as the transparent electrode 22 and the heating layer 23 may be provided to force the heating layer 23 to generate heat. The PML member 20c is then heated to the temperature between the melting point of the liquid crystals included in the PML member 20c and the macromolecular material included therein to melt the liquid crystals which are to have the characteristics of the liquid crystals.

When the charge image generated in the vicinity of the border of the PCL member 16 and the dielectric mirror 18 (or the PML member 20c if the dielectric mirror 18 is omitted) still remains therein in the case of writing, the charge image should be erased before information-erasing operation at the PML member 20c by way of heating.

In order to erase the charge image, a light for erasing is incident to the PPC 12c at the transparent electrode 14 side thereof from a light source through a lens to lower the electric resistance of the PCL member 16 in the same manner as described with reference to FIG. 9. The two transparent electrodes 14 and 22 may be short-circuited to each other, opened or grounded together. This erasing operation is applied to the preferred embodiments shown in FIGS. 15 to 17.

Each configuration of PPCs shown in FIGS. 15 to 17 is different from that of the PPC 12c shown in FIG. 14. However, reading/writing operations in the image pickup apparatus shown in FIGS. 15 to 17 are the same as those described with reference to FIG. 14, only the erasing operation being different.

In the case of the erasing operation to erase the information memorized by the orientation of the liquid crystals in the PML member 20c shown in FIGS. 15 to 17, a heating operation to heat the liquid crystals to the temperature between the melting point of the liquid crystals and that of the macromolecular material by generating heat in the heat generation layer 23a due to irradiation of the light for erasing is different from the erasing operation described with reference to FIG. 14.

The erasing operation in the image pickup apparatus shown in FIG. 15 is carried out by irradiating the heat generation layer 23a with the light from the erasing-light source 38 through the lens 40. In FIG. 16, an erasing-laser light source 38a emits a light which is deflected by the deflector 44 and reflected at a reflection mirror 56 to be incident to the heat generation layer 23a through the transparent electrode 22. While in FIG. 17, a light is incident to the heat generation layer 23a from an erasing light source not shown through the transparent electrode 14 and the PCL member 16.

The heat generation layer 23a shown in FIGS. 15 to 17 may be disposed in any location in the PPCs 12d and 12e if the heat generated therein effectively heat the liquid crystals in the PML member 20c.

Next, embodiments of the display apparatus according to the present invention will be explained with reference to FIGS. 18 to 30.

Figure 18:
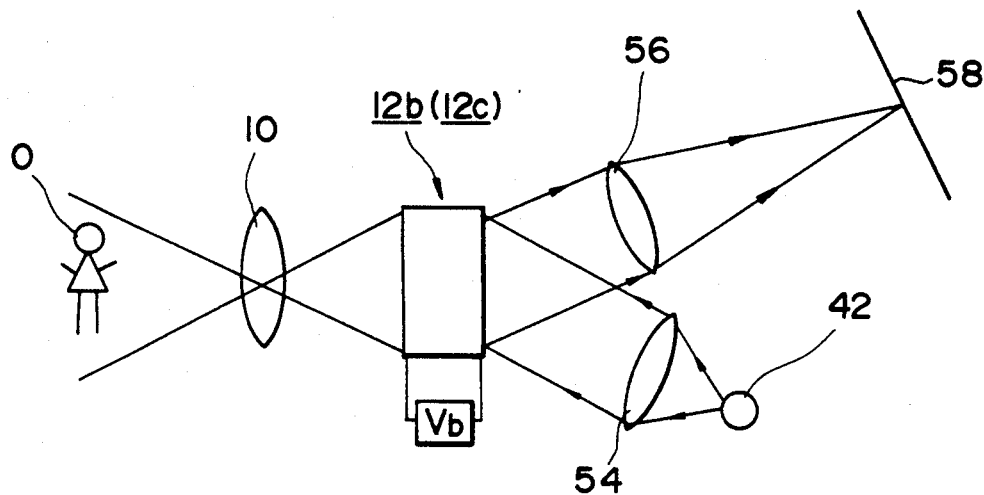
FIGS. 18 to 25 and 27 to 30 are side sectional views display apparatus according to the present invention.

A display apparatus shown in FIG. 18 converts an optical image of an object O to a charge image with high resolution by a PPC 12b (or 12c) and reads out the charge image with a light which is modulated and displayed on a screen.

Writing/reading operation of the PPC 12b shown in FIG. 18 is the same as that described with reference to FIGS. 8 to 11. A light is incident to the PPC 12b through a collimator lens 54, then the light is emitted from the PPC 12b as described before. The intensity of the light thus emitted varies accordingly with that of the light carrying an optical image of an object O and incident to the PPC 12b.

The light thus emitted is projected onto a screen 58 on which the image of the object is displayed. This results in simplification of the structure of the apparatus and effective usage of light. The image thus displayed becomes intense as the light emitted from the light source 42 intensifies. The light source 42 may be a laser light source, an incandescent lamp and an electric discharge lamp, etc. An erasing means is omitted in FIG. 18, however that described before can be applied. (This is also applied to the display apparatus shown in FIGS. 15 to 25.)

The display apparatus shown in FIGS. 15 to 25 will be explained. Writing operation to the PPC 12b is performed by a laser light intensity-modulated by the information which is to be displayed. A PPC 12g shown in FIGS. 31 to 35 may be used other than the PPC 12b (or 12c). The PPC 12g includes a PML member of PLZT porcelain in which the degree of scattering of light is repeatedly changed due to an electric field applied thereto.

When a laser light which is intensity-modulated by the information to be displayed and emitted from a laser light source 42a is incident to the PPC 12b through lenses 46 and 48 and a reflector 44 in FIG. 19, the information carried by the light is recorded in the PPC 12b as described with reference to FIGS. 8 to 11. Then, a light emitted from a light source 42 is incident to the PPC 12b and emitted therefrom as described with reference to FIG. 18. The intensity of the light thus emitted varies accordingly with the electric field due to the charge image generated in the vicinity of the border of the PCL member and the other member not shown. Therefore, the light thus emitted is projected onto a screen 58 through a projection lens 56 and then the optical image of the object is displayed on the screen 58.

Figure 20:
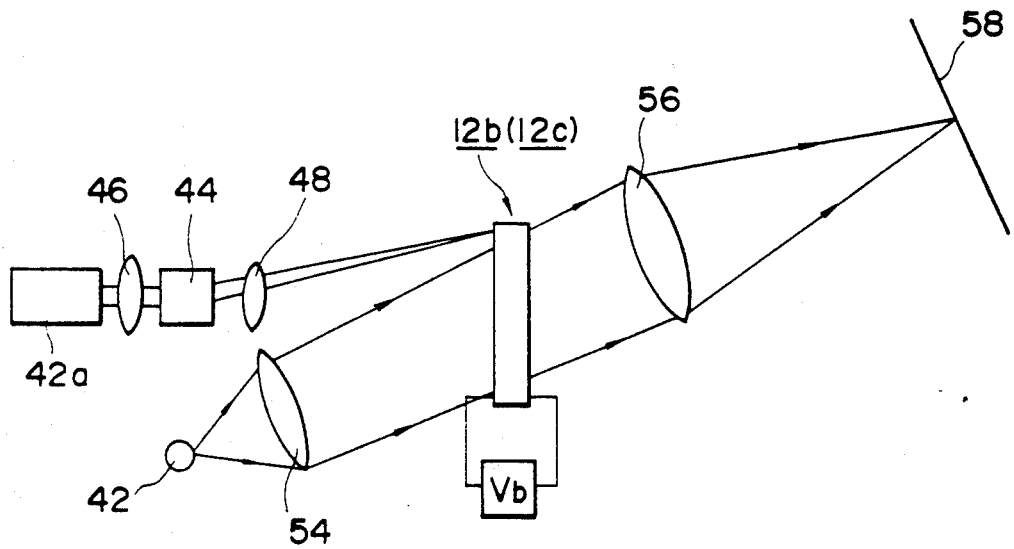
Figure 21:
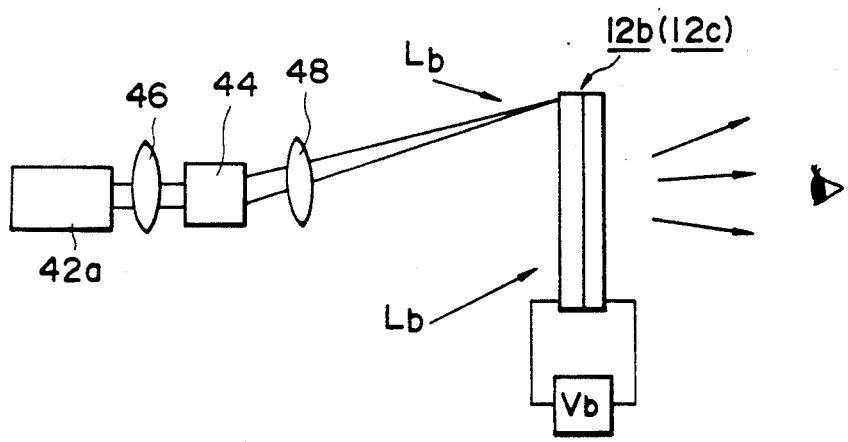
Figure 23:
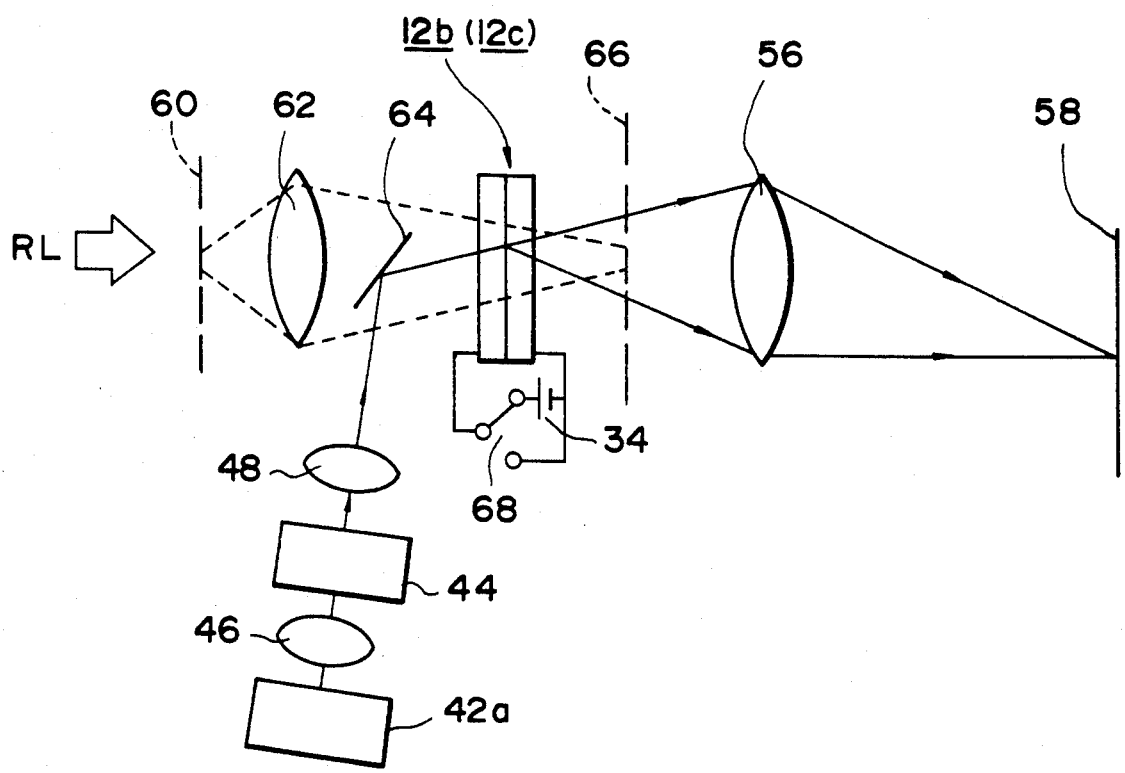

Next, in the display apparatus shown in FIGS. 20, 21 and 23, each PPC 12b (or 12c) is composed so that light for reading passes therethrough. Light for writing and reading are made incident to the PPC 12b in the same direction relative to each other. As for the PPC 12b, not a dielectric mirror which reflects the light for reading but a PCL member in sensitive to the light for reading is employed.

The writing/reading operation shown in FIG. 20 is the same as that described with reference to FIG. 19.

FIG. 21 shows the case wherein back light Lb is radiated to the PPC 12b as a light for reading instead of the light source 42 shown in FIG. 20. The light emitted from the PPC 12b at the opposite side thereof is directly watched.

Figure 19:
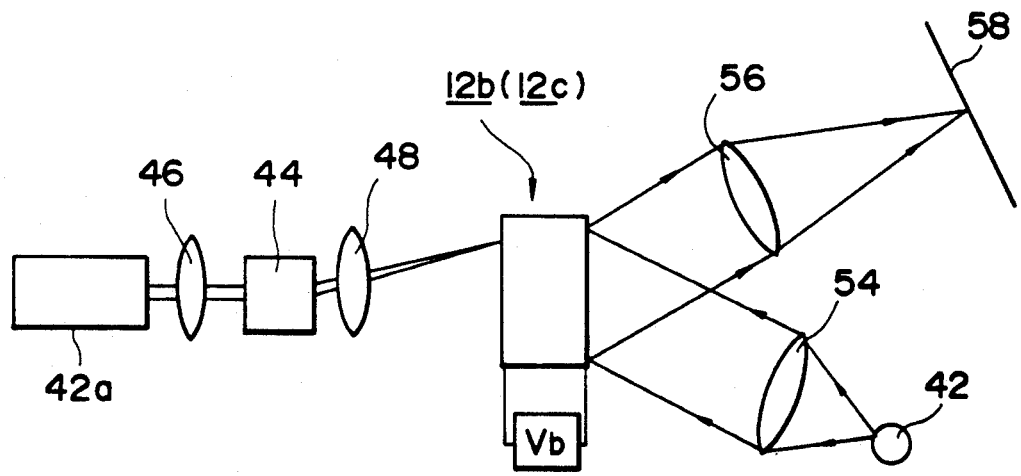
Figure 22:
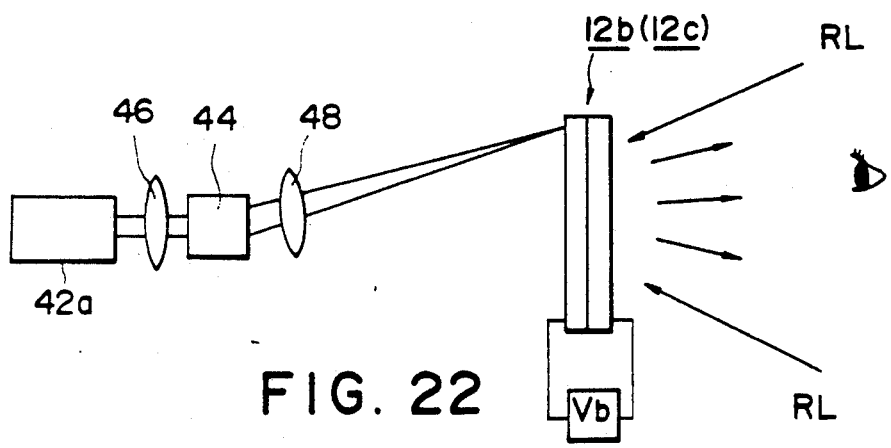

FIG. 22 shows the case wherein a PPC 12b (or 12c) is composed as a reflection type the same as that shown in FIG. 19. Writing operation is the same as that described before. A light RL is radiated to the PPC 12b at the opposite side thereof. Light emitted from the PPC 12b at the opposite side thereof is directly watched.

Figure 24:
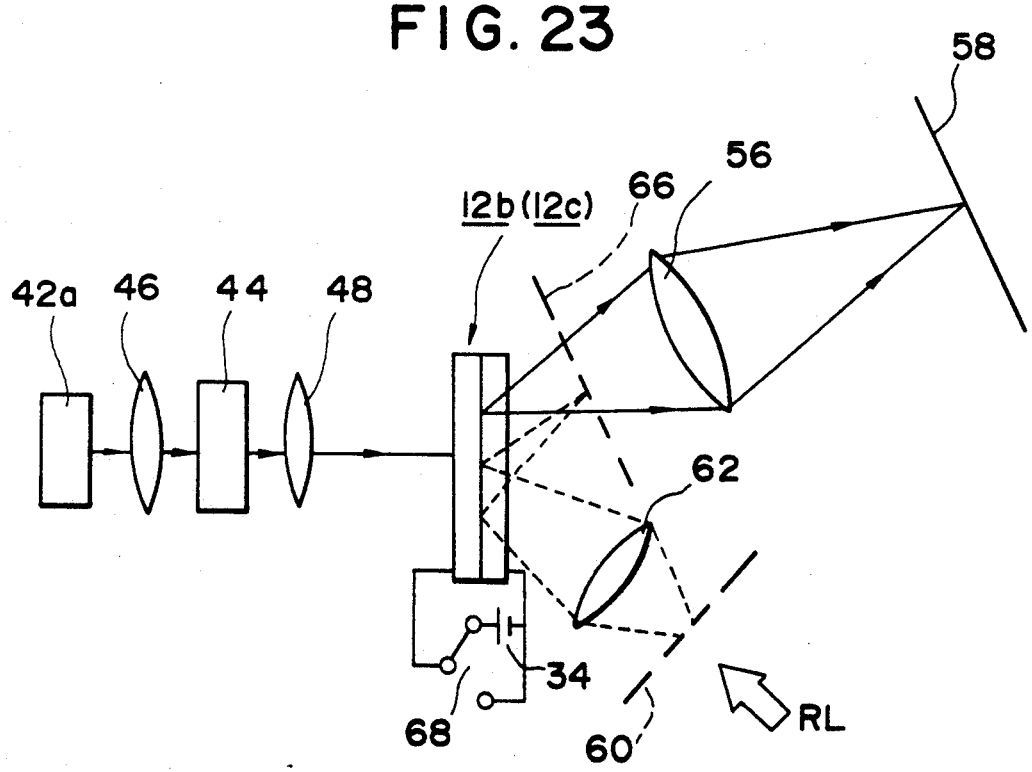

FIGS. 23 and 24 show display apparatus employing the Schlieren method for reading the information written in a PPC 12b (or 12c).

In FIG. 23, a laser light which is intensity-modulated by information to be displayed and emitted from a laser light source 42a is deflected by a deflector 44 and reflected at a dichroic mirror 64 to be incident to the PPC 12b and writes the information therein.

There are provided a d.c. power supply 34 and a switch 68 in FIGS. 23 and 24. A movable contact of the switch 68 is switched to the d.c. power supply 34 to apply a voltage to two transparent electrodes not shown and provided in the PPC 12b in the case of the writing operation. The transparent electrodes are shorted to each other by switching off the movable contact.

The display apparatus shown in FIG. 23 is provided with a transparent type PPC 12b (or 12c). Writing operation is the same as that described with reference to FIGS. 19 to 22. A light RL is incident to the PPC 12b through a mask 60 and a lens 62.

The light RL thus incident is emitted from the PPC 12b at the opposite side thereof through a Schlieren output mask 66 and a projection lens 56 and then projected onto a screen 58 on which information is displayed. These masks 60 and 66 comprise an optical system of the Schlieren method.

The display apparatus shown in FIG. 24 is provided with a reflection type PPC 12b (or 12c). Writing operation is the same as that described with reference to FIGS. 9 to 22. A light RL is incident to the PPC 12b through a Schlieren input mask 60 and a lens 62 at the opposite side. Displaying operation is the same as that described with reference to FIG. 23.

When the charge image is generated in the vicinity of the border of the PCL member and the other member in the PPC 12b, the PPC 12b scatters light incident therein. Thus, the intensity of the light passing through the mask 66 is varying accordingly with an optical image of an object. Then, the light modulated by the charge image is emitted from the PPC 12b.

Therefore, compared to a conventional photo-to-photo transducer wherein light emitted from the transducer is converted to light whose intensity is varied by an analyzer, the display apparatus according to the present invention effectively treat light. Furthermore, a light RL may be incident to a PPC 12b from the direction other than a normal line so that components such as, a semi-transparent mirror and a deflected beam splitter are eliminated from the optical path of the light RL. This results in the display apparatus being compact. This is also applied to the image pickup apparatus described hereinafter.

However, as shown in FIGS. 18 and 19, when a light is incident to a PPC 12b from the direction other than a normal line of the PPC 12b and then emitted therefrom as light whose intensity is varying accordingly with the optical image of the object to be projected onto the screen 58 through the lens 56, the light is not uniformly focused on the entire portion of the screen 58 and magnification also differs on each portion of the screen 58.

Figure 25:
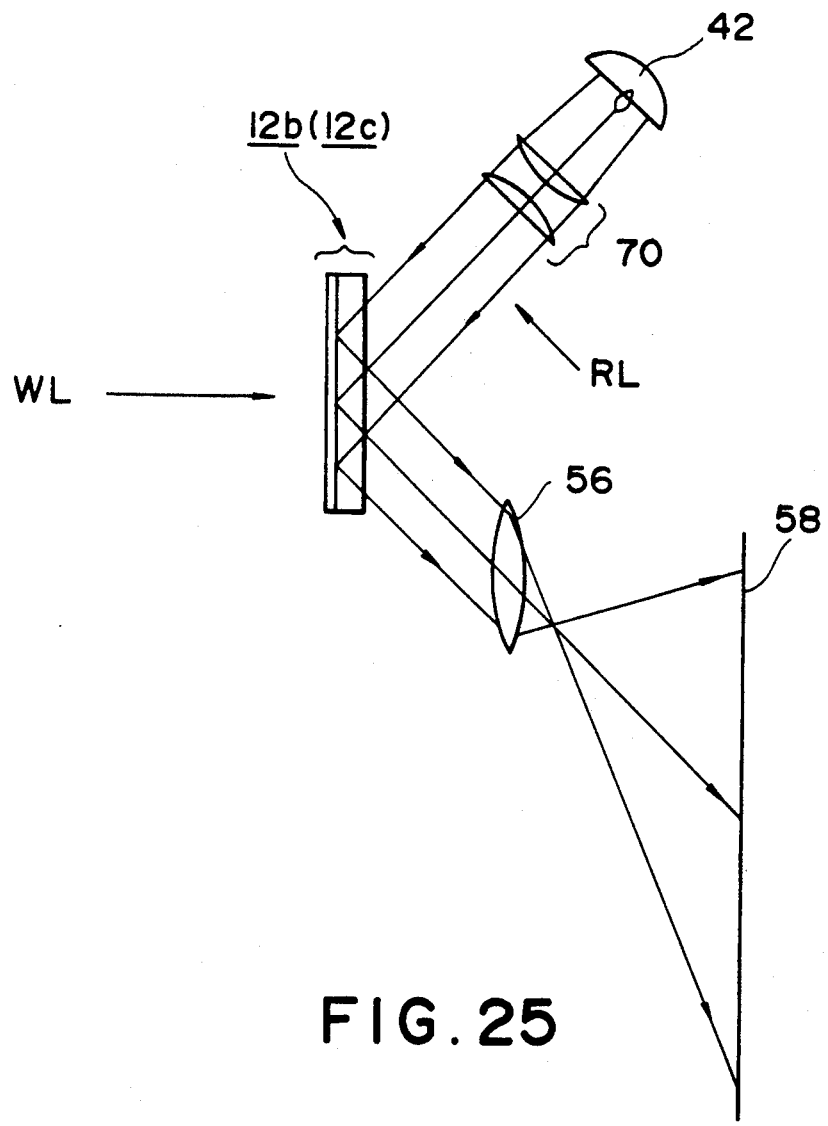

FIG. 25 shows the case wherein a same magnification is obtained over the entire screen 58 and also an image preferably projected thereon. A PPC 12b (or 12c), a projection lens 56 and the screen 58 are so arranged that the focusing plane of the PPC 12b, the main plane of the projection lens 56 and the screen 58 are parallel to each other and also the center of the focus plane of the PPC 12b, the main point of the projection lens 56 and the center of the screen 58 are aligned.

Under the above conditions, when a light RL is incident to the PPC 12b through a condenser lens 70 even in an inclined direction, a preferable image with the same magnification is projected over the screen 58.

Figure 26:
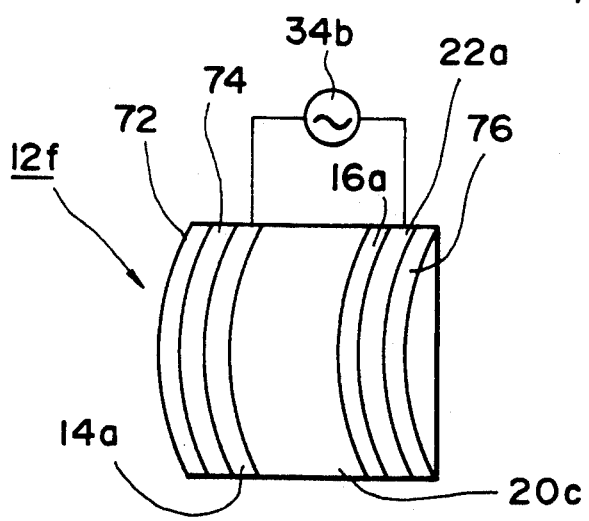
FIGS. 26 and 32 are side sectional views, for explaining photo-to-photo transducers employed in the apparatus according to the present invention.

FIG. 26 shows a PPC 12f whose light incident and emitting planes are curved. The PPC 12f is composed by laminating, in order, a supporting substrate 72, a reflecting mirror 74, a transparent electrode 14a, a PML member 20c, a PCL member 16a, a transparent electrode 22a and a supporting substrate 76. The supporting substrates 72 and 76 are for example, glass plates. The curvature may be that of part of a spherical surface, a rolling elliptical surface or a cylindrical surface, which simplifies the configuration of the PPC 12f. The PPC 12f shown in FIG. 26 having concave mirror-shaped planes is capable of focusing an image onto a screen 58 without a projection lens as shown in FIG. 27.

Figure 27:
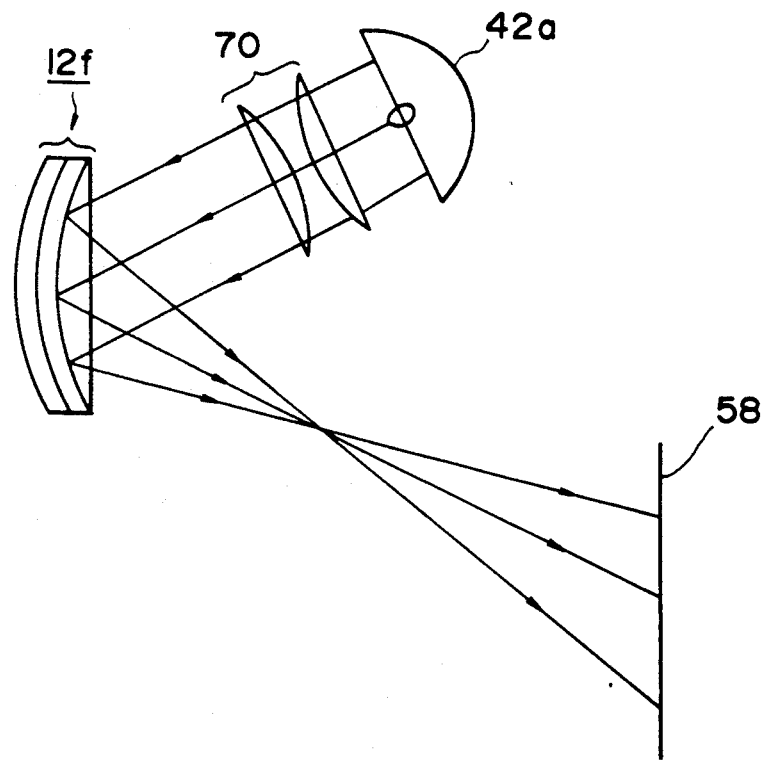

In FIG. 27, when a light emitted from a light source 42a is incident to the PPC 12f through a condenser lens 70, the light is intensity-modulated while reciprocally transferring in a PML member in the PPC 12f and is emitted therefrom to be focused on the screen 58.

Figure 28:
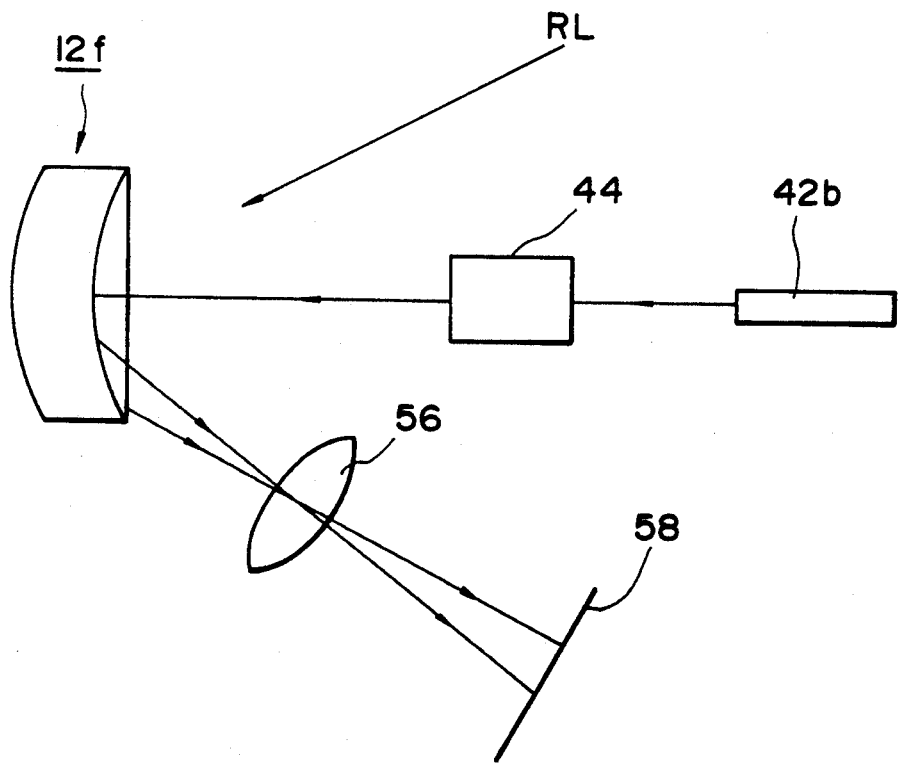

FIG. 28 shows a display apparatus in which light for reading and writing are incident to a PPC 12f having a concave mirror-shaped planes from the same direction. A PCL member included in the PPC 12f is composed so as to sense a light in the range of the writing light but not of the reading light.

Figure 29:
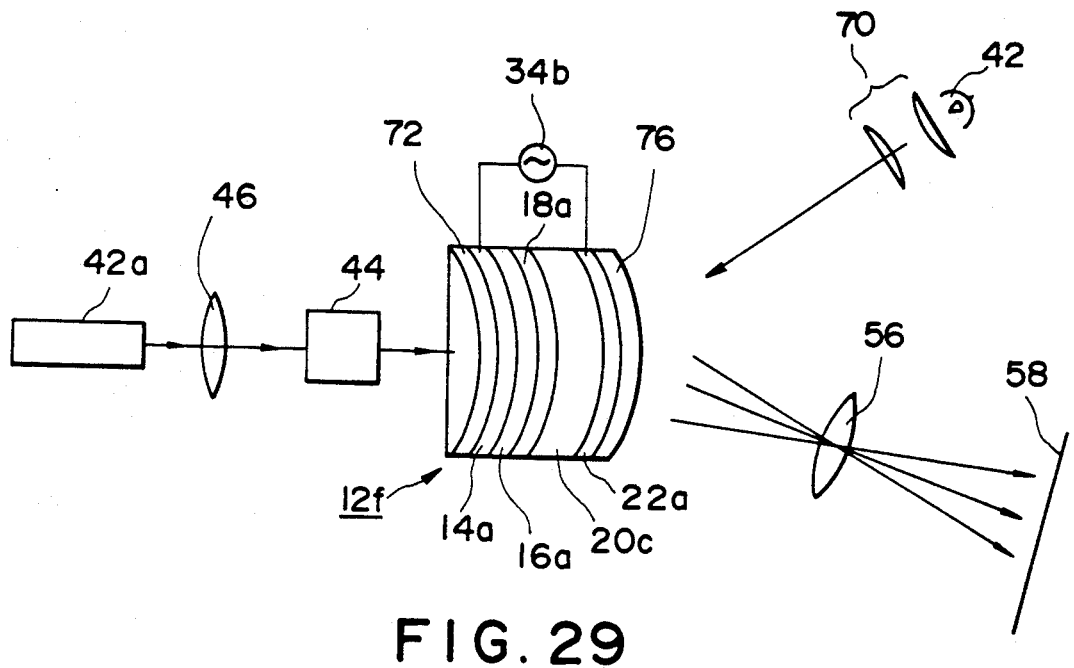

FIG. 29 shows a display apparatus in which a light for writing is incident to a PPC 12f at a concave side thereof whereas a light for reading is incident to a convex side thereof.

Figure 30:
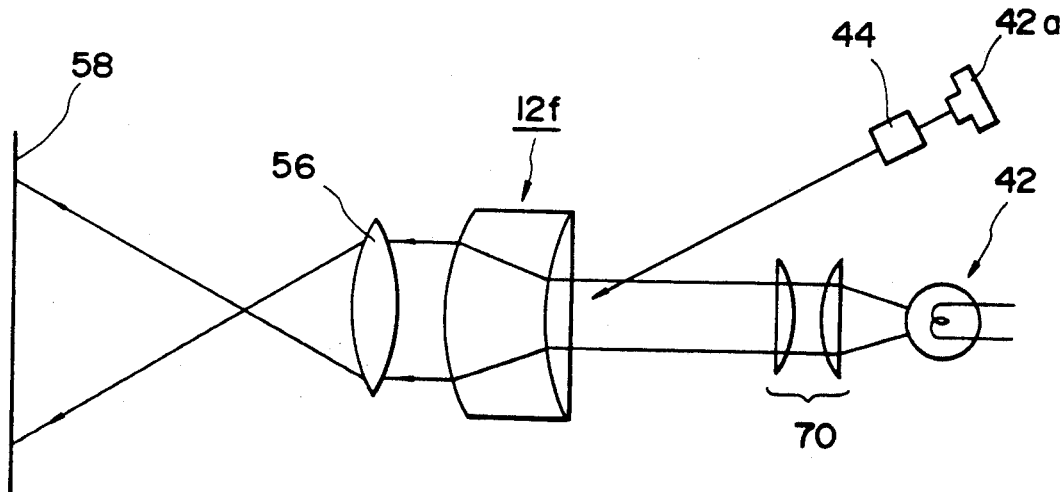

FIG. 30 shows a display apparatus in which light for reading and writing are incident to a PPC 12f at a concave side thereof and the light for reading is emitted therefrom at a convex side thereof to be focused onto a screen 58 through a projection lens 56. A PCL member included in the PPC 12f is composed so as to sense a light in the range of the writing light but not in the range of the reading light.

The following are the combination of directions from where light for reading and writing are incident to the PPC 12f for embodiments other than the preferred embodiments described above:

(1) a light for writing at a convex side and a light for reading at a concave side of the PPC 12f if of the reflection type.
(2) a light for writing at a convex side and a light for reading at a concave side of PPC 12f, both convex side or concave side thereof if of the transparent type.

The light sources 42 and 42a may be a light-emitting diode (LED) other than the laser light source.

Next, an image pickup apparatus employing a PPC having a PCL member and a PML member composed of PLZT porcelain in which the state of dispersed light is repeatedly changed due to an electric field applied thereto between two electrodes will be explained with reference to FIGS. 31 to 35.

Figure 31:
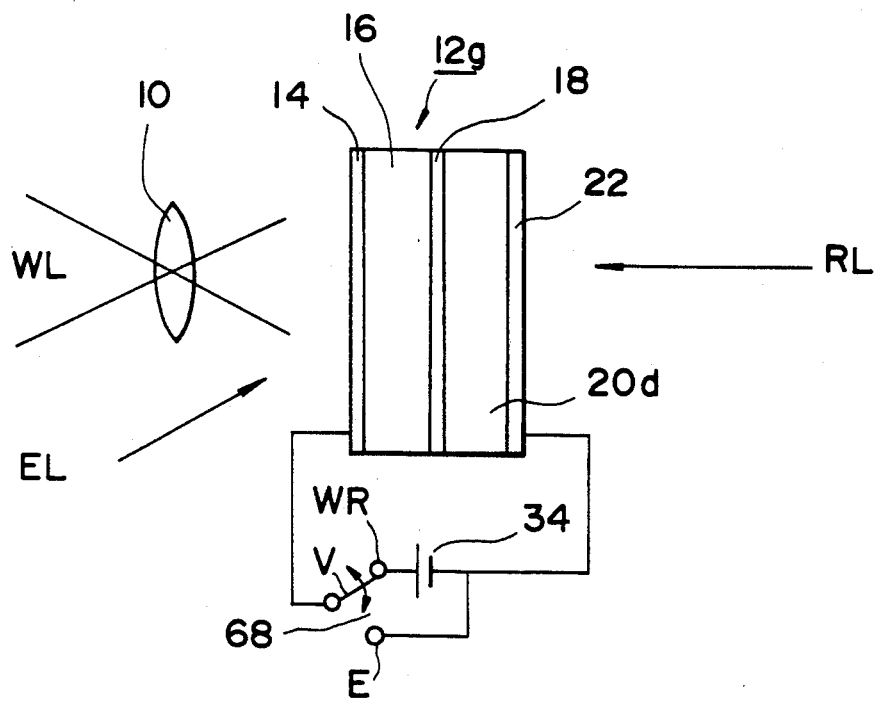
FIGS. 31 and 33 to 38 are side sectional views of the image pickup apparatus according to the present invention.

In FIG. 31, a light WL carrying an optical image of an object is incident to a PPC 12g through a lens 10 and then focused onto a PCL member 16 under the state that an electric field is applied across the PCL member 16 by applying a d.c. voltage across transparent electrodes 14 and 22 from a d.c. power supply 34 through a movable contact v and a fixed contact WR of a switch 68. The electric resistance of the PCL member 16 then varies accordingly with the optical image. There is thus generated a charge image in the vicinity of the border of PCL member 16 and a dielectric mirror 18.

An electric field with intensity distribution corresponding to the optical image is applied to a PML member 20d of PLZT porcelain in which the degree of scattering of light is repeatedly changed thereby. The refractive index of the PML member 20d therefore varies accordingly with the generated charge image due to the electro-optic effect.

When a light RL is incident to the PPC 12g at the transparent electrode 22 side, the light WL carries image information varying accordingly with the intensity distribution of the electric field applied to the PML member 20d while reciprocally transferring therein. An optical image corresponding to that carried by the light WL is therefore generated on the transparent electrode 22 side.

A dielectric mirror 18 reflects the light RL which is incident to the PML member 20d so as not to let the light RL pass therethrough to reach the PCL member 16 This prevents the charge image generated in the vicinity of the border of the PCL member 16 and the dielectric mirror 18 from being degraded.

A light EL with uniform intensity distribution is incident to the PPC 12g at the transparent electrode 14 side to erase the information written in the PPC 12f as the charge image under the state that the movable contact v of the switch 68 is switched to a fixed contact E so as to erase the electric field applied across the transparent electrodes 14 and 22.

Figure 32:
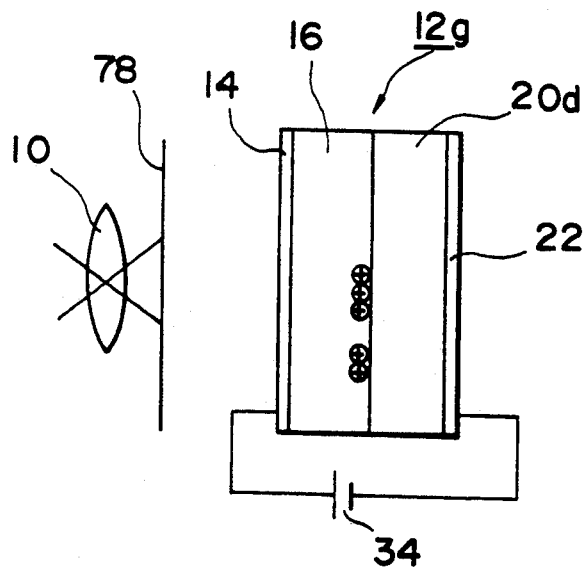

FIG. 32 shows an image pickup apparatus having an optical shutter 78 for preventing light passing through a lens 10 from being incident to a PPC 12g. The optical shutter 78 is opened to focus an optical image of an object onto a PCL member 16 in a PPC 12g, then is closed so as to maintain a charge image generated in the vicinity of the border of the PCL member 16 and a dielectric mirror not shown for a long period of time.

The optical shutter 78 is further intermittently opened to focus the optical image of the object onto the PCL member 16 in the PPC 12g to generate a charge image in the vicinity of the border of the PCL member 16 and the dielectric mirror and the image information written in the PPC 12g as the charge image is read out by scanning.

Figure 33:
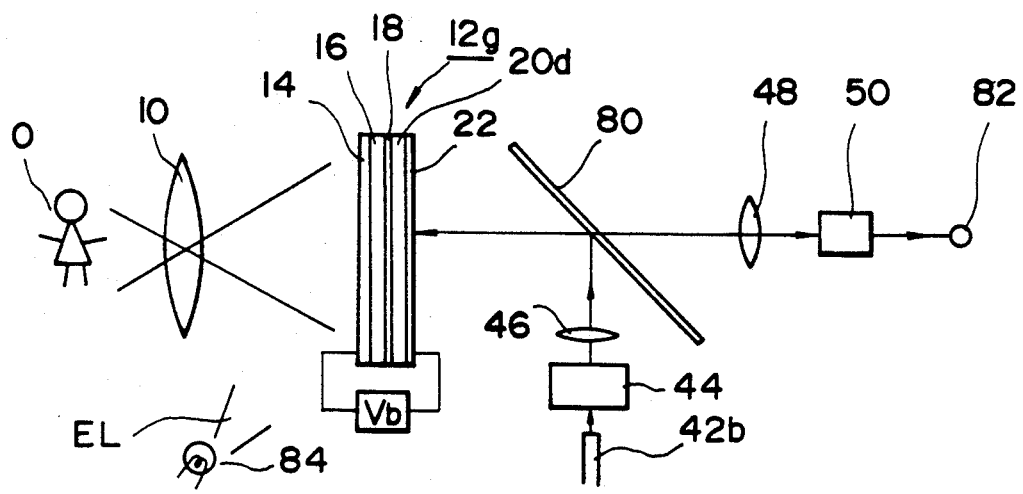

In an image pickup apparatus shown in FIG. 33, writing operation is the same as that described above. A light RL emitted from a laser source 42b is deflected by a deflector 44 and then incident to a PPC 12g at a transparent electrode 22 side through a lens 46 and a beam splitter 80 so as to read a charge image generated in the vicinity of the border of a PCL member 16 and a dielectric mirror 18.

The light RL is then emitted from the PPC 12g at the transparent electrode 22 side to be applied to a photoelectric converter 50 through a lens 48 and the beam splitter 80 in which the light RL is converted into a video signal to be applied to an output terminal 82.

As for the photo-electric converter 50, for example, a photo diode and a one-dimensional image sensor are employed. The light RL emitted from the lens 48 may be applied, as it is, to an optical signal processor for desired signal processing without photoelectric conversion. This is also applied to an image pickup apparatus shown in FIG. 34. The erasing operation is performed by radiating an erasing light EL by a light source 84. This is also applied to the image pickup apparatus shown in FIGS. 34 and 35.

Figure 34:
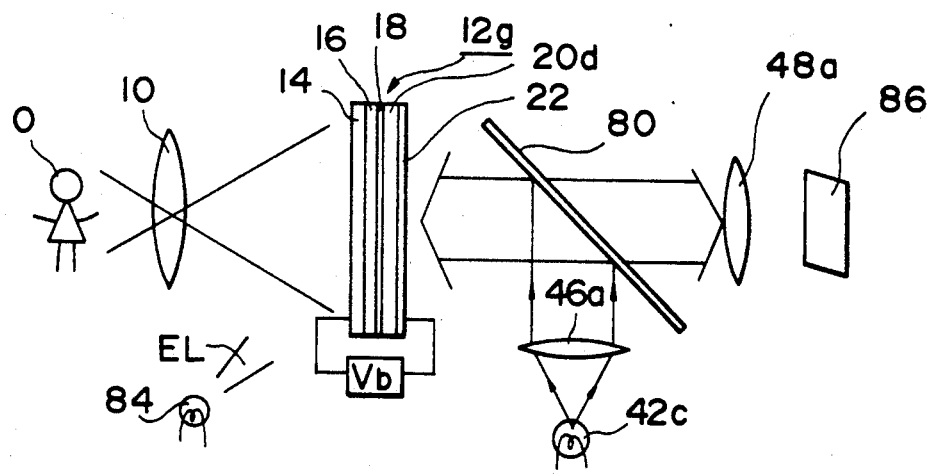

In an image pickup apparatus shown in FIG. 34, writing operation is the same as that described above. A light RL emitted from a light source 42c is made a light with a large diameter by a lens 46a and incident to a PPC 12g at a transparent electrode 22 side through a beam splitter 80 so as to read a charge image generated in the vicinity of the border of a PCL member 16 and a dielectric mirror 18. The light with the large diameter is emitted from the PPC 12g at the transparent electrode 22 side and then applied to a two-dimensional image sensor 86 through the beam splitter 80 and a lens 48a to be converted into a video signal.

Figure 35:
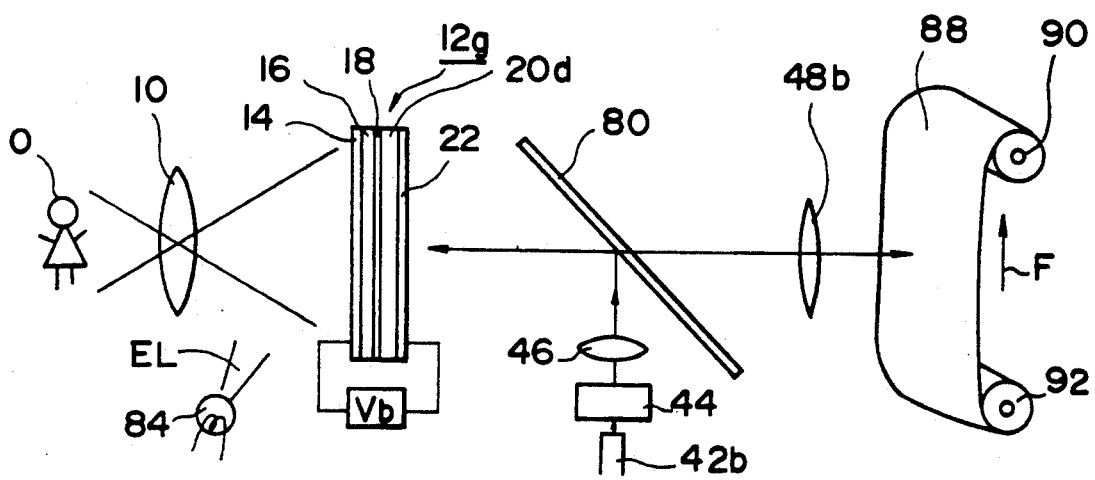

In an image pickup apparatus shown in FIG. 35, writing operation is the same as that described above. A light RL emitted from a laser light source 42b is reflected by a deflector 44 and incident to a PPC 12g at a transparent electrode 22 side through a lens 46 and a beam splitter 80 so as to read a charge image generated in the vicinity of the border of a PCL member 16 and a dielectric mirror 18.

The light is then emitted from the PPC 12g at the transparent electrode 22 and focused onto a recording medium 88 and recorded therein through the beam splitter 80 and a lens 48b. The recording medium 88 provided with reels 90 and 92 transfers in the direction depicted by arrow F.

Figure 36:
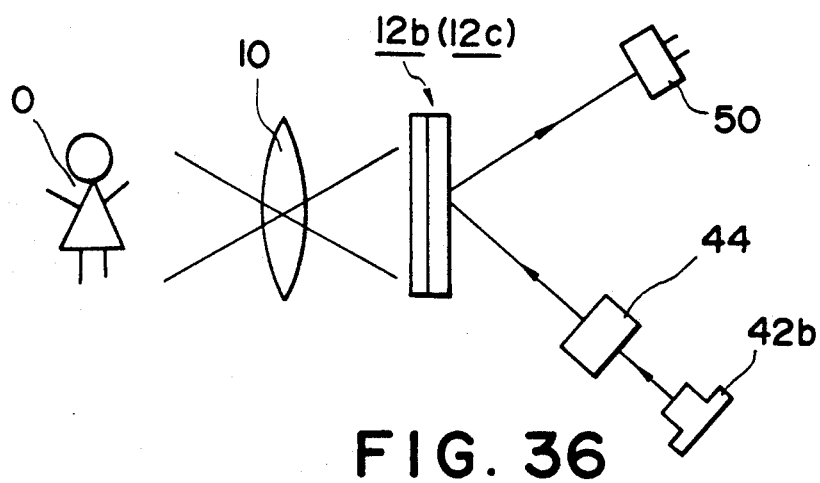
Figure 37:
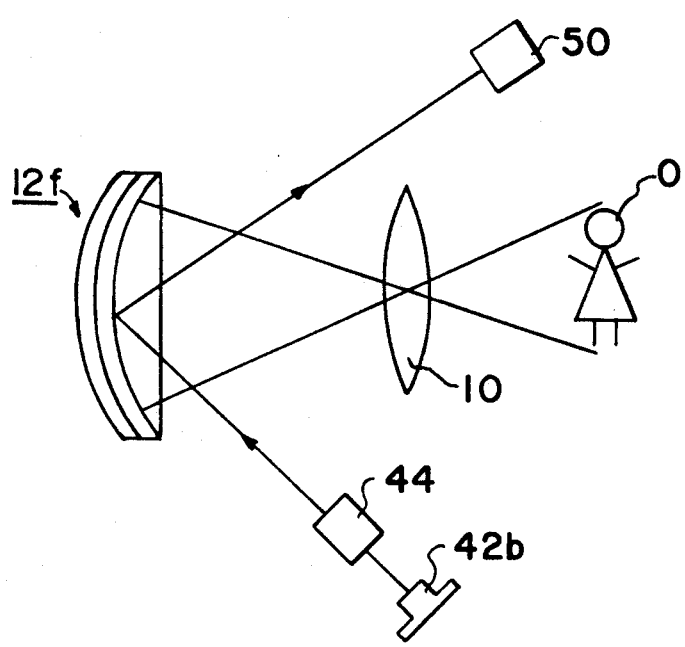
Figure 38:
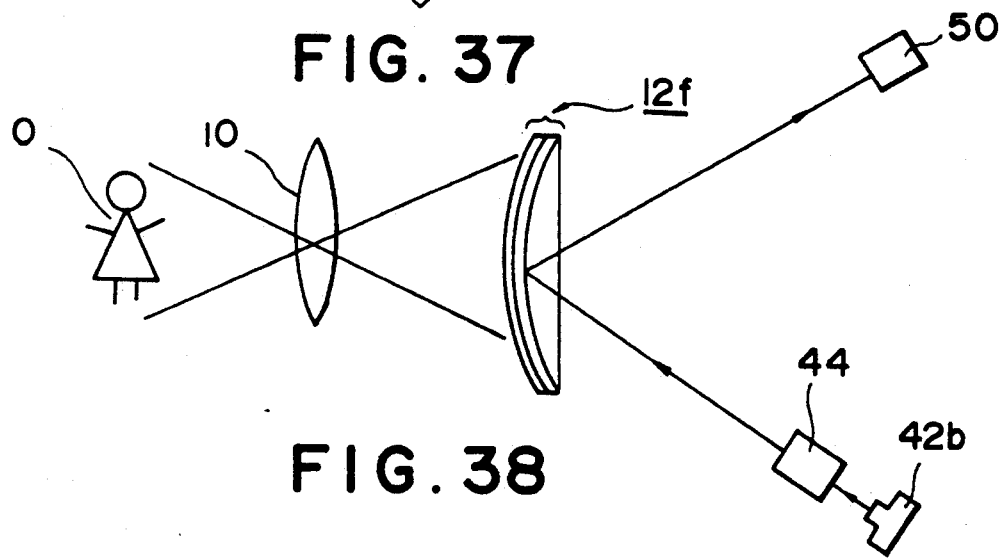

FIGS. 36 to 38 show an image pickup apparatus in which a reading light is incident to a PPC from a direction other than a normal line thereof.

FIG. 36 is the case wherein a light for reading emitted from a laser light source 42b is deflected by a deflector 44 and incident to a PPC 12b (or 12c) at an opposite side to where a light for writing is incident and from the direction other than a normal line of the PPC 12b. This results in no semi-transparent mirror being provided in an optical path of the light for reading. Therefore, the apparatus is simplified and utilization of the light for reading is improved. Another light source may be applied instead of the laser light source 42b. Furthermore, a light for reading with large diameter may be radiated onto the PPC 12b, other than scanning a light beam, to obtain a video signal by a two-dimensional image sensor.

Each PPC 12f shown in FIGS. 37 and 38 is provided with a concave mirror-shaped surface. FIG. 37 shows the case wherein light for reading and writing are incident to the PPC 12f in the same direction. A PCL member not shown included in the PPC 12f is composed such that it senses light in the range of the writing light but not in the range of the reading light. FIG. 38 shows the case wherein a light for writing is incident to a PPC 12f at a convex side and a light for reading is incident at a concave side.

What is claimed is:

1. A method of operating a photo-to-photo transducer, comprising the steps of:
    composing the photo-to-photo transducer by laminating a photoconductive layer member and a photo-modulation layer member to each other, the photo-modulation layer member including liquid crystals having a scattering mode, and disposing the members between two transparent electrodes;
    applying a specified voltage across a electrodes to operate the photo-modulation layer member in the vicinity of an operating threshold level thereof;
    projecting an electro-magnetic radiation beam for information writing onto the photoconductive layer member through one of the electrodes at a side thereof; and
    projecting an electro-magnetic radiation beam for information reading onto the photo-modulation layer member through one of the electrodes at a side thereof, whereby the electro-magnetic radiation beam for information reading is modulated accordingly with a charge distribution generated in the photoconductive layer member in accordance with the electro-magnetic radiation beam for information writing projected thereon.

2. A method of operating a photo-to-photo transducer according to claim 1 further comprising the steps of disposing a mesh electrode between the members and applying a specified voltage across the mesh electrode and one of the electrodes at a side of the photo-modulation layer member.

3. A photo-to-photo transducer, comprising:
    a first electrode through which an electro-magnetic radiation beam for writing information is passed;
    a photoconductive layer member whose impedance varies to generate electric charges when the beam thus passed is incident thereto;
    a photo-modulation layer member including liquid crystals having a scattering mode for performing photo-modulation subject to the electric charges;
    a second electrode through which an electro-magnetic radiation beam for reading the information by subjection to the photo-modulation is passed; and
    a heat generation layer member for generating heat when a voltage is applied thereto to melt the liquid crystals included in the photo-modulation layer member.

4. A photo-to-photo transducer according to claim 3 wherein surfaces of the first and second electrodes are formed in the shape of a curve.

5. A photo-to-photo transducer comprising:
    a first electrode through which an electro-magnetic radiation beam for writing information is passed;
    a photoconductive layer member whose impedance varies to generate electric charges when the beam thus passed is incident thereto;
    a photo-modulation layer member including liquid crystals having a scattering mode for performing photo-modulation subject to the electric charges;
    a second electrode through which an electro-magnetic radiation beam for reading the information by subjection to the photo-modulation is passed; and
    a heat generation layer member for generating heat when an electro-magnetic radiation beam for erasing the information is incident thereto to melt the liquid crystals included in the photo-modulation layer member.

6. A photo-to-photo transducer according to claim 5, wherein surfaces of the first and the second electrodes are formed in the shape of a curve.

7. A photo-to-photo transducer, comprising:
    a first electrode through which an electro-magnetic radiation beam for writing information is passed;
    a photoconductive layer member whose impedance varies to generate electric charges when the beam thus passed is incident thereto;
    a photo-modulation layer member composed of porcelain of Lead Lanthanum Zirconate Titanate having a mode for performing photo-modulation in which dispersion of an electro-magnetic radiation beam repeatedly varies in accordance with the subjection of the photo-modulation layer member to the electric charges; and
    a second electrode through which an electro-magnetic radiation beam for reading the information by subjection to the photo-modulation is passed.

8. An image pickup apparatus, comprising:
    holding means for holding a photo-to-photo transducer composed by laminating a photoconductive layer member between two transparent electrodes, said photo-modulation layer member and a photo-modulation layer member including liquid crystals having a scattering mode for performing modulation of an electro-magnetic radiation beam in accordance with a charge distribution generated in the photoconductive layer member by exposure to an electro-magnetic radiation beam;
    voltage applying means for applying a specified voltage across the electrode to operate the photo-modulation layer member in a vicinity of an operating threshold level thereof;
    first projection means for projecting an electro-magnetic radiation beam for information writing onto the photoconductive layer member through one of the electrodes at a side thereof; and
    second projection means for projecting an electro-magnetic radiation beam for information reading onto the photo-modulation layer member through one of the electrodes at a side thereof.

9. An image pickup apparatus according to claim 8 wherein the first projection means projects the electro-magnetic radiation beam onto the photoconductive layer member from a direction different from a line normal to the photo-to-photo transducer.

10. An image pickup apparatus, comprising:
    holding means for holding a photo-to-photo transducer composed by laminating a photoconductive layer member and a photo-modulation layer member between two transparent electrodes, said photo-modulation layer member being composed of porcelain of Lead Lanthanum Zirconate Titanate in which dispersion of an electro-magnetic radiation beam repeatedly varies in accordance with an electric charge distribution generated in the photoconductive layer ember by exposure to an electro-magnetic radiation beam;

first projection means for projecting an electro-magnetic radiation beam for information writing onto the photoconductive layer member through the electrode at the side thereof; and second projection means for projecting an electro-magnetic radiation beam for information reading onto the photo-modulation layer member through the electrode at the side thereof.

11. A display apparatus, comprising:

holding means for holding a photo-to-photo transducer composed by laminating a photoconductive layer member and a photo-modulation layer member between two transparent electrodes, said photo-modulation layer member including liquid crystals having a scattering mode for performing modulation of an electro-magnetic radiation beam in accordance with a charge distribution generated in the photoconductive layer member by exposure to an electro-magnetic radiation beam;

voltage applying means for applying a specified voltage across the electrodes to operate the photo-modulation layer member in a vicinity of an operating threshold level thereof;

first projection means for projecting an electro-magnetic radiation beam for information writing onto the photoconductive layer member through one of the electrodes at a side thereof;

second projection means for projecting an electro-magnetic radiation beam for information reading onto the photo-modulation layer member through one of the electrodes at a side thereof;

taking means for taking out the beam thus projected onto the photo-modulation layer member; and display means for displaying the beam thus taken out thereon.

12. A display apparatus according to claim 11 further comprises erasing means for erasing information to be written.

13. A display apparatus according to claim 11 wherein the first projection means projects the electro-magnetic radiation beam onto the photoconductive layer member from a direction different from a line normal to the photo-to-photo transducer.

* * * * *